(12) United States Patent
Uchida

(10) Patent No.: US 10,757,338 B2
(45) Date of Patent: *Aug. 25, 2020

(54) IMAGING APPARATUS CAPABLE OF DETERMINING WHETHER AN APODIZATION FILTER IS PRESENT OR NOT AND SELECTING FIRST AND SECOND PROGRAM DIAGRAMS

(71) Applicant: FUJIFILM Corporation, Tokyo (JP)

(72) Inventor: Akihiro Uchida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 88 days.

This patent is subject to a terminal disclaimer.

(21) Appl. No.: 16/149,905

(22) Filed: Oct. 2, 2018

(65) Prior Publication Data

US 2019/0037119 A1 Jan. 31, 2019

Related U.S. Application Data

(60) Division of application No. 15/716,081, filed on Sep. 26, 2017, now Pat. No. 10,122,934, which is a
(Continued)

(30) Foreign Application Priority Data

Mar. 27, 2015 (JP) .................................. 2015-067014

(51) Int. Cl.
*H04N 5/235* (2006.01)
*G03B 7/097* (2006.01)
(Continued)

(52) U.S. Cl.
CPC .......... *H04N 5/2352* (2013.01); *G03B 7/097* (2013.01); *G03B 7/18* (2013.01); *G03B 11/00* (2013.01);
(Continued)

(58) Field of Classification Search
CPC ............... H04N 5/2352; H04N 5/2254; H04N 5/23209; H04N 5/23212; H04N 5/23219;
(Continued)

(56) References Cited

U.S. PATENT DOCUMENTS 5,764,292 A 6/1998 Yamaguchi
7,099,555 B2 * 8/2006 Onuki ...................... G02B 5/22
250/208.1

(Continued)

FOREIGN PATENT DOCUMENTS

| JP | 63-206729 A | 8/1988 |
| JP | 10-268382 A | 10/1998 |
| JP | 2005-62733 A | 3/2005 |

OTHER PUBLICATIONS

International Preliminary Report on Patentability and English Translation of Written Opinion of the International Searching Authority dated Oct. 3, 2017, issued in PCT/JP2016/057215 (Forms PCT/IB/373 and PCT/ISA/237).
(Continued)

*Primary Examiner* — Luong T Nguyen
(74) *Attorney, Agent, or Firm* — Birch, Stewart, Kolasch & Birch, LLP

(57) ABSTRACT

A subject information acquisition section acquires a subject distance difference, which is distance difference between a main subject and a subject farthest from the main subject, on the basis of an imaging signal sent from an imaging element. A program diagram storage section stores a first program diagram where an aperture value is fixed at an open aperture value at a first amount of exposure EV1 or less, and stores a second program diagram where an aperture value is fixed at an open aperture value at a second amount of exposure EV2, which is greater than the first amount of exposure EV1, or less. An imaging exposure determination section selects the second program diagram in a case where an APD filter
(Continued)

is disposed on the optical path and a case where the subject distance difference is equal to or greater than a threshold value and there is an imaged scene in which a blurred image tends to occur, and selects the first program diagram in a case where the subject distance difference is less than the threshold value and there is an imaged scene in which a blurred image is hard to occur.

7 Claims, 20 Drawing Sheets

Related U.S. Application Data continuation of application No. PCT/JP2016/057215, filed on Mar. 8, 2016.

(51) Int. Cl.
| | |
|---|---|
| *G03B 7/18* | (2006.01) |
| *G03B 11/00* | (2006.01) |
| *H04N 5/238* | (2006.01) |
| *G03B 13/36* | (2006.01) |
| *H04N 5/225* | (2006.01) |
| *H04N 5/232* | (2006.01) |

(52) U.S. Cl.
CPC ........... *G03B 13/36* (2013.01); *H04N 5/2254* (2013.01); *H04N 5/238* (2013.01); *H04N 5/2351* (2013.01); *H04N 5/2357* (2013.01); *H04N 5/23209* (2013.01); *H04N 5/23212* (2013.01); *H04N 5/23219* (2013.01)

(58) Field of Classification Search
CPC ........... H04N 5/23251; H04N 5/23257; H04N 5/238; G03B 11/00; G03B 7/097; G03B 13/36; G03B 7/18
See application file for complete search history.

(56) References Cited

U.S. PATENT DOCUMENTS

| | | | |
|---|---|---|---|
| 7,113,318 | B2 | 9/2006 | Onuki et al. |
| 7,783,189 | B2 | 8/2010 | Kubota |
| 8,854,487 | B2 | 10/2014 | Ikeda |
| 8,896,742 | B2 | 11/2014 | Fukushima |
| 10,122,934 | B2* | 11/2018 | Uchida .................. G03B 7/097 |
| 2005/0041949 | A1 | 2/2005 | Onuki et al. |
| 2011/0242684 | A1* | 10/2011 | Shinohara .............. G02B 13/18 |
| | | | 359/738 |
| 2012/0162382 | A1* | 6/2012 | Hirasawa ............... G03B 7/095 |
| | | | 348/47 |

OTHER PUBLICATIONS

International Search Report dated May 17, 2016, issued in PCT/JP2016/057215 (Form PCT/ISA/210) with an English translation.
Non-Final Office Action issued in copending U.S. Appl. No. 15/716,081, dated Mar. 8, 2018.
Notice of Allowance issued in copending U.S. Appl. No. 15/716,081, dated Jul. 24, 2018.
Requirement for Restriction/Election issued in copending U.S. Appl. No. 15/716,081, dated Dec. 22, 2017.

* cited by examiner

FIG. 6(A)
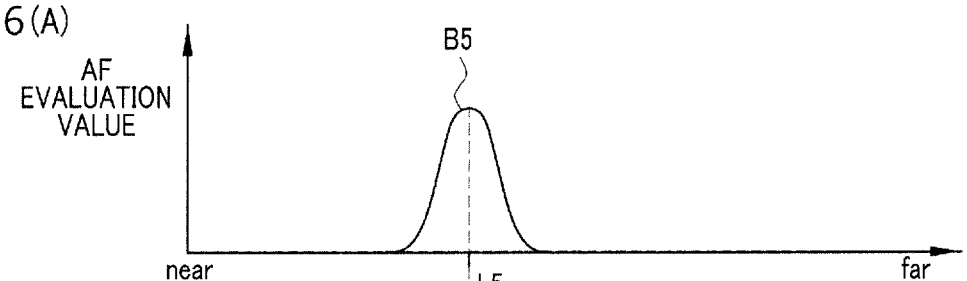
FIG. 6(B)
FIG. 6(C)
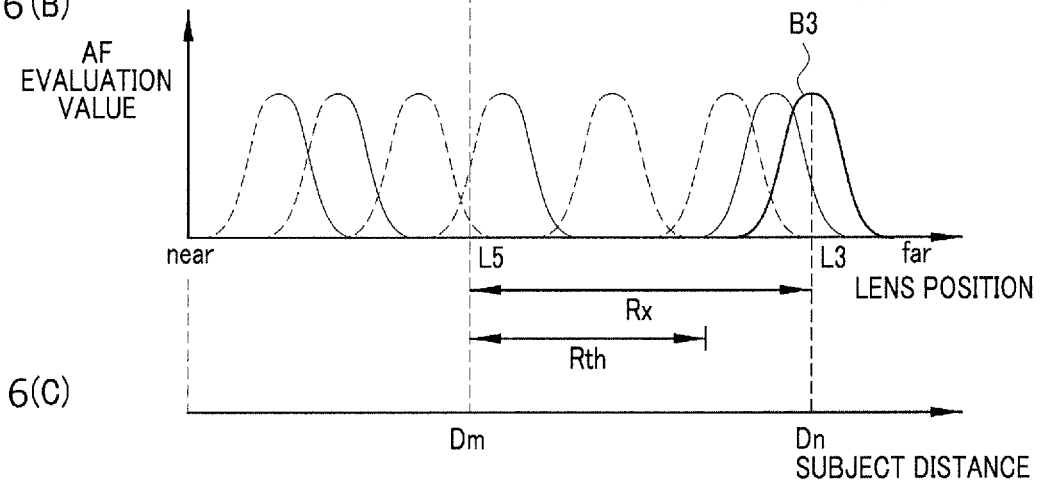
FIG. 7
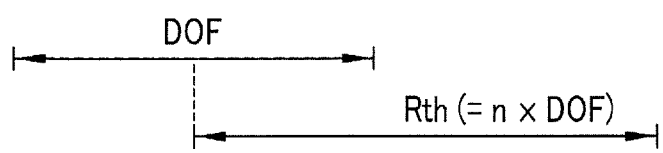

FIG. 8(A)
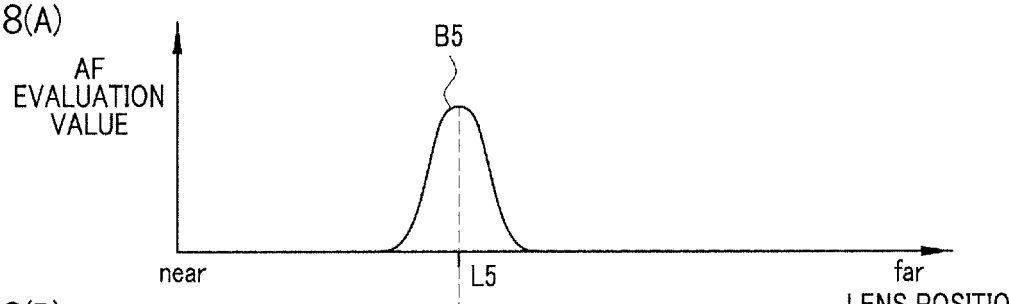
FIG. 8(B)
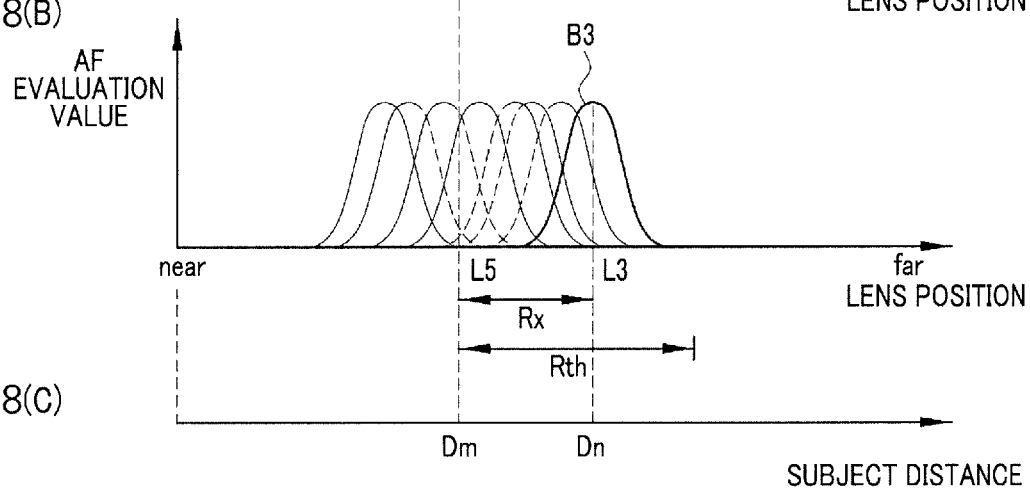
FIG. 8(C)

IMAGING APPARATUS CAPABLE OF DETERMINING WHETHER AN APODIZATION FILTER IS PRESENT OR NOT AND SELECTING FIRST AND SECOND PROGRAM DIAGRAMS

CROSS-REFERENCE TO RELATED APPLICATIONS

This application is a Divisional of copending U.S. application Ser. No. 15/716,081 filed on Sep. 26, 2017, which is a Continuation of PCT International Application No. PCT/JP2016/057215 filed on Mar. 8, 2016, which claims priority under 35 U.S.C § 119(a) to Japanese Patent Application No. 2015-067014 filed on Mar. 27, 2015. The above applications are hereby expressly incorporated by reference, in their entirety, into the present applications.

BACKGROUND OF THE INVENTION

1. Field of the Invention

The present invention relates to an imaging apparatus comprising an apodization filter, an imaging apparatus body, and a method of controlling the imaging apparatus.

2. Description of the Related Art

There are known imaging apparatuses comprising apodization filters (hereinafter referred to as an APD filter) (refer to JP2005-62733A (corresponding to US2005/0041949A1)). The APD filter has an optical characteristic that light transmittance is lower at a position farther from the optical axis. Consequently, a dimming effect obtained by the APD filter becomes larger as an aperture value becomes closer to an open aperture value.

The APD filter decreases an amount of peripheral light in only blurred images (out-of-focus points of light and the like), which are out of focus, without decreasing an amount of peripheral light on the image plane, and gives gradation to the outlines of the blurred images, thereby realizing beautiful blurring. In order to realize beautiful blurring through the APD filter, it is a premise that blurring occurs in a background of a main subject. In order to cause blurring in the background, it is not necessary to lower a depth of field, and it is necessary for a stop to be opened as much as possible and to be preferably set as a fully open stop.

JP2005-62733A describes a method of automatically determining imaging exposure (imaging aperture value and imaging shutter speed) on the basis of a program diagram for APD in a case where the APD filter is inserted in the optical axis. In the program diagram for APD (hereinafter referred to as a second program diagram), in order to preferentially determine an open aperture value as the imaging aperture value, a region, in which an aperture value is fixed at the open aperture value, is set to be large as compared with a normal program diagram (hereinafter referred to as a first program diagram). Hence, in the second program diagram, as compared with the first program diagram, in order to preferentially determine an open aperture value as the imaging aperture value, an imaging shutter speed may be increased. In a case where the imaging shutter speed is increased, there is a concern about a problem such as flickering. However, in a case of using the APD filter, in order to preferentially generate a blurred image of the background, the imaging shutter speed should be increased.

In the imaging apparatus described in JP2005-62733A, in a case where the APD filter is not inserted, the first program diagram is used. However, in the imaging apparatus, in accordance with insertion and removal of the APD filter, switching to the second program diagram is not performed. Thus, in cases of inserting and removing the APD filter, there is a problem in that a user has to perform operations relating to the switching of the program diagrams.

JP1988-206729A (JP-S63-206729A) describes, as in the APD filter, an imaging apparatus which is configured to be capable of inserting and removing a soft focus filter into and from the optical axis. The soft focus filter is a filter for achieving beautiful blurring in blurred images occurring in a background of a main subject. Also in the imaging apparatus described in JP1988-206729A (JP-S63-206729A), the first and second program diagrams are used. JP1988-206729A (JP-S63-206729A) proposes a method of automatically switching program diagrams in accordance with insertion and removal of the soft focus filter such that it is not necessary for a user to perform the operations relating to the switching of the program diagrams.

SUMMARY OF THE INVENTION

Also in the imaging apparatus of JP2005-62733A, it is conceivable to automatically switch between the first program diagram and the second program diagram in accordance with insertion and removal of the APD filter by applying the technique described in JP1988-206729A (JP-S63-206729A). The second program diagram used in a case where the APD filter is inserted in the optical path is for keeping the depth of field low by preferentially using the open aperture value, and thus it is a premise that the diagram is used in the imaged scene where a blurred image occurs in the background since there is a distance difference between the background and the main subject.

However, in the imaging apparatus described in JP2005-62733A, depending on a user, imaging may be performed in an imaged scene in which there is no difference in distance between the main subject and the background while the APD filter is inserted in the optical path and a blurred image does not occur in the background. As such an imaged scene, for example, a situation where an image of a painting or the like in doors is captured can be considered.

In a case where overexposure occurs in such an imaged scene, in the second program diagram, in order to keep the depth of field low by preferentially using the open aperture value, by adjusting the shutter speed, the imaging shutter speed is increased. In a case where the imaging shutter speed is increased, adverse effects such as flickering may occur under an indoor light source such as a fluorescent lamp.

The present invention has an object to provide an imaging apparatus capable of appropriately selecting first and second program diagrams, an imaging apparatus body, and a method of controlling the imaging apparatus.

An imaging apparatus of the present invention comprises an imaging element, a stop, a photometric section, an apodization filter, a program diagram storage section, a subject information acquisition section, and an imaging exposure determination section. An imaging element photoelectrically converts incident light so as to output an imaging signal. A stop adjusts a light amount of the incident light. A photometric section performs photometry on the basis of the imaging signal. An apodization filter is disposed on an optical path of the incident light. A program diagram storage section stores a first program diagram and a second program diagram. In the first program diagram, an aperture value is fixed at an open aperture value at a first amount of exposure or less. In the second program diagram, an aperture value is fixed at an open aperture value at a second amount of exposure, which is greater than the first amount of exposure, or less. A subject information acquisition section acquires subject information on the basis of the imaging signal. An imaging exposure determination section selects the second program diagram in a case where the apodization filter is disposed on the optical path and the subject information satisfies a first condition, selects the first program diagram in a case where the apodization filter is not disposed on the optical path and a case where the apodization filter is disposed on the optical path and the subject information does not satisfy the first condition, and determines one group of an imaging aperture value and an imaging shutter speed, on the basis of an amount of imaging exposure which is calculated from a photometric value obtained by the photometric section.

It is preferable that the subject information acquisition section acquires, as the subject information, a subject distance difference between a main subject and a subject farthest from the main subject, and it is preferable that the imaging exposure determination section sets the first condition as a condition in which the subject distance difference is equal to or greater than a threshold value.

It is preferable that in addition to the subject distance difference, the subject information acquisition section acquires, as the subject information, a main subject distance which is a subject distance up to a main subject, and it is preferable that the imaging exposure determination section sets the first condition as a condition in which the main subject distance is less than a specific distance and the subject distance difference is equal to or greater than a threshold value.

It is preferable that the subject information acquisition section divides an imaging range of the imaging element into a plurality of blocks, calculates a subject distance for each of the blocks, and calculates the subject distance difference and the main subject distance from the subject distance of each of the blocks.

It is preferable that a shutter speed corresponding to the second amount of exposure in the second program diagram is faster than a shutter speed corresponding to the first amount of exposure in the first program diagram.

It is preferable that the imaging apparatus further comprises a mechanical shutter, and it is preferable that the shutter speed corresponding to the second amount of exposure in the second program diagram is a limit speed on a high speed side of the mechanical shutter.

It is preferable that the imaging element has an electronic shutter function capable of making an imaging shutter speed faster than the limit speed. It is preferable that the program diagram storage section stores a third program diagram in which an aperture value is fixed at an open aperture value at a third amount of exposure, which is greater than the second amount of exposure, or less. In addition, it is preferable that the imaging exposure determination section selects the third program diagram in a case where the first condition is satisfied and a second condition different from the first condition is satisfied, and selects the second program diagram in a case where the first condition is satisfied and the second condition is not satisfied.

It is preferable that the imaging apparatus further comprises a movement detection section that detects an amount of movement of the main subject on the basis of the imaging signal of a plurality of frames. It is preferable that the electronic shutter function is a rolling shutter system, and it is preferable that the imaging exposure determination section sets the second condition as a condition in which the amount of movement is equal to or less than a specific value.

It is preferable that the imaging apparatus further comprises a flickering detection section that detects whether or not flickering occurs by calculating a change in luminance value from the imaging signal of the plurality of frames. It is preferable that the imaging exposure determination section sets the second condition as a condition in which the flickering is not detected.

It is preferable that, in addition to the subject distance difference, the subject information acquisition section acquires, as the subject information, a size of a face of a subject in a case where whether or not the face is present is detected on the basis of the imaging signal, the main subject distance is less than a specific distance, and then the face is present. It is preferable that the imaging exposure determination section sets the first condition as a condition in which the size of the face is equal to or greater than a threshold value in the case where the face is detected.

In an imaging apparatus body of the present invention, a first lens barrel having an apodization filter and a second lens barrel having no apodization filter are mountable. The imaging apparatus body comprises an imaging element, a stop, a photometric section, a program diagram storage section, a subject information acquisition section, and an imaging exposure determination section. An imaging element photoelectrically converts incident light so as to output an imaging signal. A stop adjusts a light amount of the incident light. A photometric section performs photometry on the basis of the imaging signal. A program diagram storage section stores a first program diagram and a second program diagram. In the first program diagram, an aperture value is fixed at an open aperture value at a first amount of exposure or less. In the second program diagram, an aperture value is fixed at an open aperture value at a second amount of exposure, which is greater than the first amount of exposure, or less. A subject information acquisition section acquires subject information on the basis of the imaging signal. An imaging exposure determination section selects the second program diagram in a case where the first lens barrel is mounted and the subject information satisfies a first condition, selects the first program diagram in a case where the second lens barrel is mounted and a case where the first lens barrel is mounted and the subject information does not satisfy the first condition, and determines one group of an imaging aperture value and an imaging shutter speed, on the basis of an amount of imaging exposure which is calculated from a photometric value obtained by the photometric section.

There is provided a method of controlling an imaging apparatus of the present invention. The imaging apparatus includes an imaging element that photoelectrically converts incident light so as to output an imaging signal, a stop that adjusts a light amount of the incident light, a photometric section that performs photometry on the basis of the imaging signal, an apodization filter that is disposed on an optical path of the incident light, a program diagram storage section that stores a first program diagram in which an aperture value is fixed at an open aperture value at a first amount of exposure or less and a second program diagram in which an aperture value is fixed at an open aperture value at a second amount of exposure, which is greater than the first amount of exposure, or less, and a subject information acquisition section that acquires subject information on the basis of the imaging signal. The method of controlling the imaging apparatus comprises: selecting the second program diagram in a case where the apodization filter is disposed on the optical path and the subject information satisfies a first condition; selecting the first program diagram in a case where the apodization filter is not disposed on the optical path and a case where the apodization filter is disposed on the optical path and the subject information does not satisfy the first condition; and determining one group of an imaging aperture value and an imaging shutter speed, on the basis of an amount of imaging exposure which is calculated from a photometric value obtained by the photometric section.

According to the present invention, the second program diagram is selected in a case where the apodization filter is disposed on the optical path and the subject information satisfies a first condition, and the first program diagram is selected in a case where the apodization filter is not disposed on the optical path and a case where the apodization filter is disposed on the optical path and the subject information does not satisfy the first condition. Therefore, it is possible to appropriately select the first and second program diagrams.

BRIEF DESCRIPTION OF THE DRAWINGS

FIG. 6(A) is a diagram illustrating an example of an AF evaluation value in an AF area which includes a main subject. FIG. 6(B) is a diagram illustrating a first example of the AF evaluation value in an area other than the AF area. FIG. 6(C) is a diagram illustrating an example of a subject distance with respect to a lens position of a focus lens.

FIG. 7 is a diagram illustrating a relationship between a depth of field and a threshold value.

FIG. 8(A) is a diagram illustrating an example of an AF evaluation value in the AF area which includes the main subject. FIG. 8(B) is a diagram illustrating a second example of the AF evaluation value in an area other than the AF area. FIG. 8(C) is a diagram illustrating an example of a subject distance with respect to a lens position of the focus lens.

DESCRIPTION OF THE PREFERRED EMBODIMENTS

First Embodiment

Figure 1:
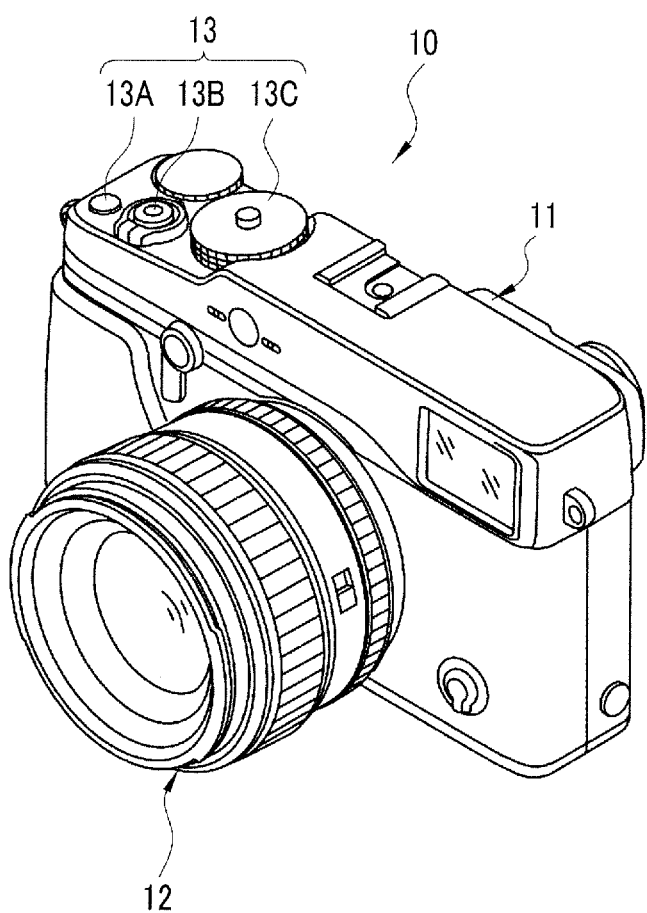
FIG. 1 is an external perspective view of an imaging apparatus of a first embodiment.

As shown in FIG. 1, the imaging apparatus 10 is an interchangeable lens type digital camera, and comprises an imaging apparatus body 11 and a first lens barrel 12 which is detachably mounted on the imaging apparatus body 11. The first lens barrel 12 is a lens barrel which has an apodization (APD) filter 26 (refer to FIG. 2).

In the imaging apparatus body 11, an operation section 13 is provided. The operation section 13 includes a power button 13A, a shutter button 13B, a mode switch dial 13C, and the like. The power button 13A operates in a case where power of the imaging apparatus 10 is turned on/off.

The shutter button 13B is a two-stage-stroke-type switch which is capable of so-called "half pressing" and "full pressing". The shutter button 13B outputs an S1-on signal through half pressing, and outputs an S2-on signal through full pressing which is more pressed than half pressing. The imaging apparatus 10 performs imaging preparation processing such as auto focus adjustment (AF) control or auto exposure control in a case where the S1-on signal is output from the shutter button 13B, and performs imaging processing in a case where the S2-on signal is output.

The mode switch dial 13C switches operation modes. The operation modes include a moving image capturing mode, a still image capturing mode, and a reproduction mode. In the moving image capturing mode, moving image capturing is performed by fully pressing the shutter button 13B during live view display. In the still image capturing mode, still image capturing is performed by fully pressing the shutter button 13B during live view display. In the reproduction mode, a moving image or a still image stored in a memory 46 (refer to FIG. 2) is reproduced and displayed on a display section 44 (refer to FIG. 2). In the live view display, no image is recorded, and image display is performed in real time on the display section 44 (refer to FIG. 2).

Figure 2:
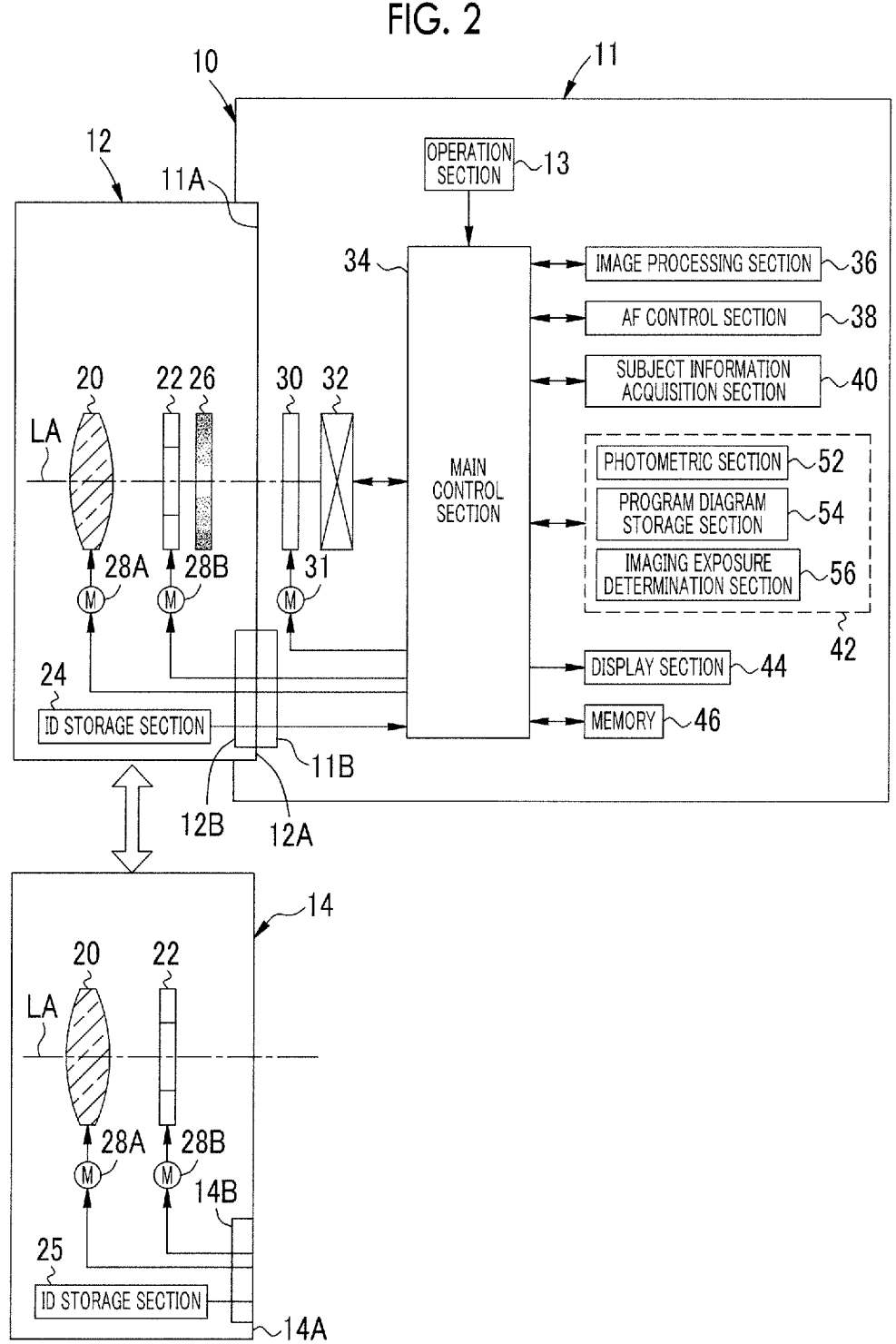
FIG. 2 is a block diagram illustrating a configuration of the imaging apparatus of the first embodiment.

In FIG. 2, a lens barrel mount section 11A is provided on the imaging apparatus body 11. A proximal end portion 12A of the first lens barrel 12 is mounted on the lens barrel mount section 11A. An electrical contact point 11B is provided on the lens barrel mount section 11A. The electrical contact point 11B comes into contact with an electrical contact point 12B, which is provided on the proximal end portion 12A, so as to electrically connect the imaging apparatus body 11 and the first lens barrel 12.

Further, in the imaging apparatus body 11, instead of the first lens barrel 12 having the APD filter 26, a second lens barrel 14 not having the APD filter 26 is detachably provided. In the second lens barrel 14, a proximal end portion 14A is mounted on the lens barrel mount section 11A of the imaging apparatus body 11. In a manner similar to that of the first lens barrel 12, an electrical contact point 14B, which comes into contact with the electrical contact point 11B of the lens barrel mount section 11A, is provided on the proximal end portion 14A of the second lens barrel 14.

The first lens barrel 12 has a focus lens 20, a stop 22, an identification data (ID) storage section 24, and the APD filter 26. The focus lens 20, the stop 22, and the APD filter 26 are disposed on an optical axis LA of the first lens barrel 12, in order from the subject side. The optical axis LA corresponds to an optical path of light incident from the subject.

The second lens barrel 14 has a focus lens 20, a stop 22, and an ID storage section 25. The focus lens 20 and the stop 22 are disposed on an optical axis LA of the second lens barrel 14, in order from the subject side.

The focus lens 20 concentrates light incident from the subject, and forms an image thereof. Further, the focus lens 20 moves in a direction of the optical axis LA through driving of a motor 28A, on the basis of control of a main control section 34 to be described later, and adjusts an imaging distance. The motor 28A is a stepping motor or a servo motor.

The stop 22 adjusts the amount of incident light. The stop 22 moves a plurality of stop blades (not shown in the drawing) through driving of the motor 28B on the basis of the control of the main control section 34 to be described later, and changes the amount of light incident onto the imaging element 32 to be described later. The motor 28B is a stepping motor or a servo motor.

The ID storage sections 24 and 25 store IDs for specifying kinds of the lens barrels. The IDs are used for specifying whether or not the APD filter 26 is present through the main control section 34 to be described later. The ID storage section 24 of the first lens barrel 12 stores IDs including information that the APD filter 26 is provided. The ID storage section 25 of the second lens barrel 14 stores IDs including information that the APD filter 26 is not provided.

The IDs stored in the ID storage section 24 are transmitted to the imaging apparatus body 11 through the electrical contact points 11B and 12B in a case where the imaging apparatus body 11 and the first lens barrel 12 are connected. Further, the IDs stored in the ID storage section 25 are transmitted to the imaging apparatus body 11 through the electrical contact points 11B and 14B in a case where the imaging apparatus body 11 and the second lens barrel 14 are connected.

Figure 3:
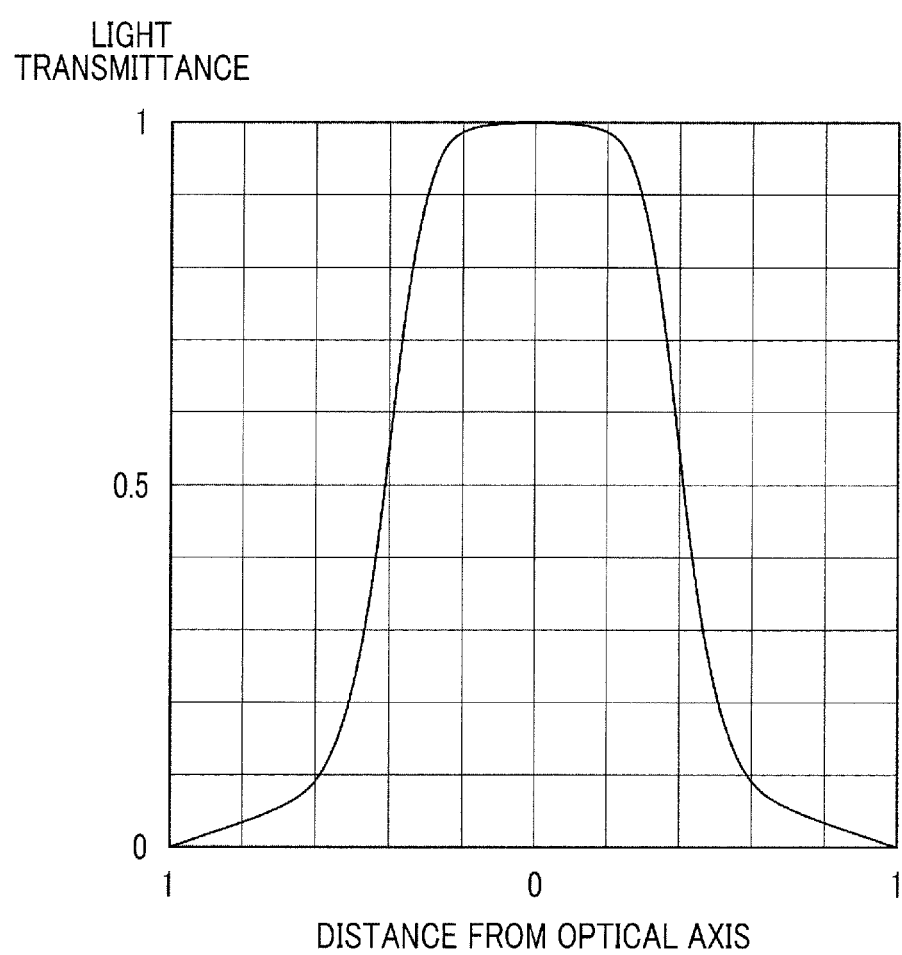
FIG. 3 is a diagram illustrating an optical characteristic of an APD filter.

As shown in FIG. 3, the APD filter 26 has an optical characteristic that light transmittance becomes lower as the distance from the optical axis LA becomes larger. The APD filter 26 decreases the amount of peripheral light in blurred images (out-of-focus points of light and the like), which are out of focus, without decreasing an amount of peripheral light on the image plane. Due to such an optical characteristic, the APD filter 26 gives gradation to the outlines of the blurred images, whereby it is possible to obtain an apodization effect of realizing beautiful blurring.

An amount of dimming of the APD filter 26 becomes larger as the aperture value (F number) of the stop 22 becomes closer to an open value. The F number is an aperture value defined by an effective aperture diameter of the stop 22, where a transmittance of light within an effective aperture region is not considered. An actual aperture value, in which the transmittance of light within the effective aperture region is considered, is a T value. Assuming that the light transmittance is P, the T value is generally represented by Expression (1).

$$T=F/P^{1/2} \quad (1)$$

In a case where the light transmittance of the APD filter 26 is applied to the light transmittance P of Expression (1), it is possible to obtain the T value in which the optical characteristic of the APD filter 26 is considered. A relationship between the T value and the F number is indicated by a curve shown in FIG. 4. A difference between the T value and the F number becomes larger as the F number becomes closer to the open value.

In the present embodiment, in the APD filter 26, in a case where the F number is greater than 2.8, the amount of dimming becomes almost zero, and thus it is possible to obtain a dimming effect in a region in which the F number is equal to or less than 2.8. That is, a threshold value Fth of the F number capable of obtaining an apodization effect is "2.8".

Figure 4:
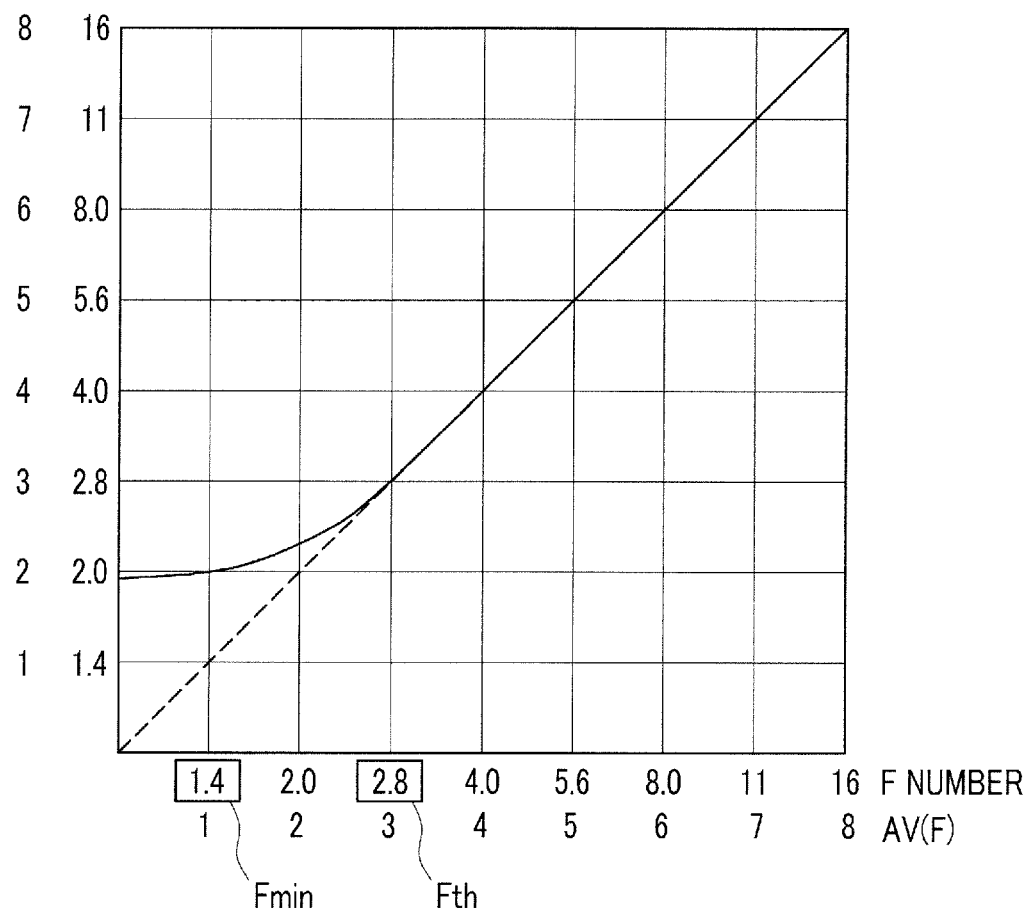
FIG. 4 is a graph illustrating a relationship between an F number and a T value.

In FIG. 4, an AV(F) and an AV(T) defined by Expressions (2) and (3) are described. The AV(F) is an aperture value (AV) corresponding to the F number. The AV(T) is an AV corresponding to the T value.

$$AV(F)=2\times\log_2(F) \quad (2)$$

$$AV(T)=2\times\log_2(T) \quad (3)$$

In the present embodiment, an open aperture value Fmin of the stop 22 is "1.4". According to FIG. 4, the T value corresponding to the open aperture value Fmin is "2.0". Consequently, the amount of dimming, which is performed by the APD filter 26 in a case where the stop 22 is set at the open aperture value Fmin, corresponds to a value (value at which the light amount is set to ½ thereof) corresponding to one stage of AV.

Inside the imaging apparatus body 11, a shutter unit 30, an imaging element 32, a main control section 34, an image processing section 36, an AF control section 38, a subject information acquisition section 40, an exposure control section 42, the display section 44, and the memory 46 are provided.

The shutter unit 30 is a mechanical shutter such as a focal plane shutter. The shutter unit 30 is provided to block the optical path between the lens barrel mount section 11A and the imaging element 32. The shutter unit 30 performs opening and closing operations by driving the shutter motor 31 on the basis of control of the main control section 34 to be described later.

The imaging element 32 photoelectrically converts the incident light which is incident through the shutter unit 30, and outputs an imaging signal. The imaging signal, which is output from the imaging element 32, is input to the image processing section 36. The imaging element 32 is a complementary metal oxide semiconductor (CMOS) sensor, and has an electronic shutter function. The shutter speed of the electronic shutter function can be controlled by the main control section 34.

The main control section 34 comprises a central processing unit (CPU), a read only memory (ROM) which stores parameters and programs used in the CPU, a random access memory (RAM) which is used as a work memory for the CPU, and the like (any of those is not shown in the drawing). Other processing sections (such as the image processing section, the AF control section, the subject information acquisition section and the exposure control section) are configured by the CPU executing corresponding programs. The main control section 34 is electrically connected to respective sections of the imaging apparatus 10, and integrally controls the entirety of the imaging apparatus 10, on the basis of the operation signals which are input from the operation section 13. The main control section 34 receives the S1-on signal and the S2-on signal from the shutter button 13B. Further, the main control section 34 specifies the operation modes, which are currently set, by using the mode switch dial 13C.

The main control section 34 receives the IDs from the ID storage sections 24 and 25 through the electrical contact point 11B. The main control section 34 specifies a kind (whether it is the first lens barrel 12 or the second lens barrel 14) of the lens barrel connected to the imaging apparatus body 11, on the basis of the received ID.

Further, the main control section 34 determines whether the APD filter 26 is present, on the basis of the specified kind of the lens barrel. Specifically, the main control section 34 determines that the APD filter 26 is present in a case where the specified lens barrel is the first lens barrel 12, and determines that the APD filter 26 is not present in a case where the specified lens barrel is the second lens barrel 14. Then, the main control section 34 transmits the determination result as APD filter information to an imaging exposure determination section 56.

The image processing section 36 generates image data from the imaging signal which is sent from the imaging element 32. The image processing section 36 transmits the generated image data to the display section 44 and the memory 46. The display section 44 displays an image based on the image data. The memory 46 stores the image data. Further, the image processing section 36 generates a luminance signal by performing Y/C conversion on the received imaging signal, and transmits the generated luminance signal to the exposure control section 42.

The AF control section 38 executes AF control through a contrast AF method, on the basis of the imaging signal. In the AF control, while the focus lens 20 is moved, the AF evaluation value (a value of summation of high-frequency wave components) is calculated on the basis of the imaging signal. Then, the AF control section 38 detects a position (in-focus position) of the focus lens 20 at which the AF evaluation value becomes the maximum, and moves the focus lens 20 to the in-focus position. The AF evaluation value corresponds to the contrast of the image. An AF area, in which the in-focus position of the main subject is obtained, is, for example, a central region of the imaging range. The AF control section 38 calculates the AF evaluation value from the signal included in the AF area in the imaging signal, and thereby detects the in-focus position. In addition, the in-focus position is acquired in a state where the stop 22 is open.

Figure 5:
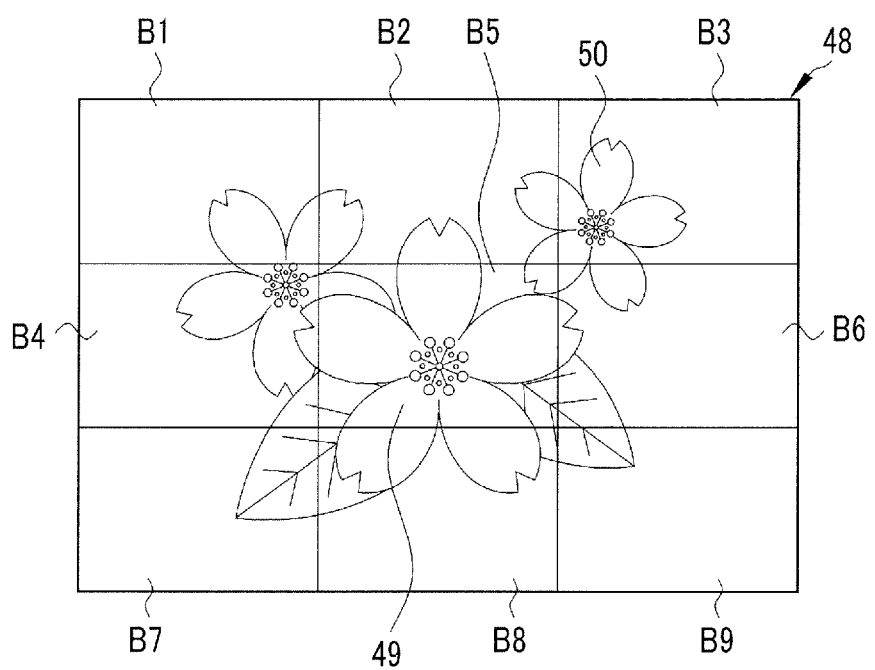
FIG. 5 is a diagram illustrating an imaging range divided into a plurality of blocks.

The subject information acquisition section 40 acquires subject information about a subject within an angle of view, on the basis of the imaging signal. In the present embodiment, the subject information is a distance difference (subject distance difference) between the main subject and a subject farthest from the main subject. Specifically, as shown in FIG. 5, the subject information acquisition section 40 divides the imaging range 48 of the imaging element 32 into a plurality of blocks, calculates the subject distance for each block, and calculates the subject distance difference from the subject distance of each block.

For example, the subject information acquisition section 40 divides the imaging range 48 into nine blocks B1 to B9. The block I35, which is positioned at the center of the imaging range 48, is the above-mentioned AF area. The block B5 includes an image of the main subject 49. The subject information acquisition section 40 uses the in-focus position, which is obtained in the AF area through the AF control section 38, as the in-focus position (the in-focus position of the main subject 49) of the block B5.

The subject information acquisition section 40 controls the AF control section 38 such that it performs AF control for each block of the blocks B1 to B4 and B6 to B9 around the block B5 as the AF area. Thereby, the subject information acquisition section 40 acquires an in-focus position of a subject other than the main subject 49 for each of the blocks B1 to B4 and B6 to B9. In addition, the in-focus position is acquired in a state where the stop 22 is open.

The subject information acquisition section 40 calculates a subject distance for each of the blocks B1 to B9 on the basis of each in-focus position which is obtained for each of the blocks B1 to B9. As shown in FIG. 6(A), the subject information acquisition section 40 calculates a subject distance up to the main subject 49 (refer to FIG. 5), on the basis of an in-focus position L5 of the block B5 as the AF area. The subject distance in the block B5 corresponds to a main subject distance Dm shown in FIG. 6(C). Further, as shown in FIG. 6(B), the subject information acquisition section 40 respectively calculates the subject distances up to the subjects other than the main subject 49, on the basis of the respective in-focus positions of the blocks B1 to B4 and B6 to B9 other than the AF area. For example, on the basis of an in-focus position L3 of the block B3, a subject distance up to a subject 50 (refer to FIG. 5) is calculated. The subject distance in the block B3 corresponds to a subject distance Dn shown in FIG. 6(C).

The subject information acquisition section 40 calculates a subject distance difference Rx between the main subject distance Dm and the subject distance of the subject farthest from the main subject 49, by comparing the calculated main subject distance Dm and the other subject distances. The subject distance difference Rx corresponds to a distance difference between the in-focus position of the block including an image of the main subject 49 and the in-focus position of the block including an image of the subject at the longest distance away from the main subject 49. The subject information acquisition section 40 transmits the calculated subject distance difference Rx to the imaging exposure determination section 56 through the main control section 34.

Specifically, the subject information acquisition section 40 calculates the distance differences (absolute values of the difference) between the main subject distance Dm and the respective subject distances of the blocks B1 to B4 and B6 to B9, and sets the largest distance difference as the subject distance difference Rx. In the example shown in FIG. 6(B), the in-focus position L3 of the block B3 is at a longest distance away from the in-focus position L5 of the block B5. The distance difference (|Dn−Dm|) between the main subject distance Dm and the subject distance Dn of the subject 50 included in the block B3 is largest, and the distance difference is set as the subject distance difference Rx.

By comparing the subject distance difference Rx with a threshold value Rth determined on the basis of a depth of field, it is possible to determine whether or not a blurred image tends to occur in the background of the main subject 49 which is in focus. As shown in FIG. 7, the threshold value Rth is n times the depth of field DOF in a case where the stop 22 is open. The constant n is set as a value equal to or greater than 0.5.

Accordingly, as shown in FIG. 6(B), in a case where the subject distance difference Rx satisfies a relationship of Rx≥Rth, a blurred image tends to occur in the background of the main subject 49. In contrast, as shown in FIGS. 8(A) to 8(C), in a case where the subject distance difference Rx satisfies a relationship of Rx<Rth, a blurred image is hard to occur in the background of the main subject 49. FIG. 8(A) shows the in-focus position L5 of the AF area (block B5) including the main subject 49. FIG. 8(B) shows a subject distance difference Rx in a case where Rx<Rth is satisfied. FIG. 8(C) shows the main subject distance Dm of the main subject 49, and a subject distance Dn of the subject 50 farthest from the main subject 49.

The exposure control section 42 determines an amount of exposure, a shutter speed, and an aperture value (hereinafter referred to as an amount of imaging exposure, an imaging shutter speed, and an imaging aperture value) which are optimal for imaging, on the basis of the luminance signal. The exposure control section 42 comprises a photometric section 52, a program diagram storage section 54, and an imaging exposure determination section 56.

The photometric section 52 calculates a photometric value on the basis of the luminance signal which is sent from the image processing section 36, thereby performing photometry on a subject. The photometric section 52 transmits the calculated photometric value to the imaging exposure determination section 56.

Figure 9:
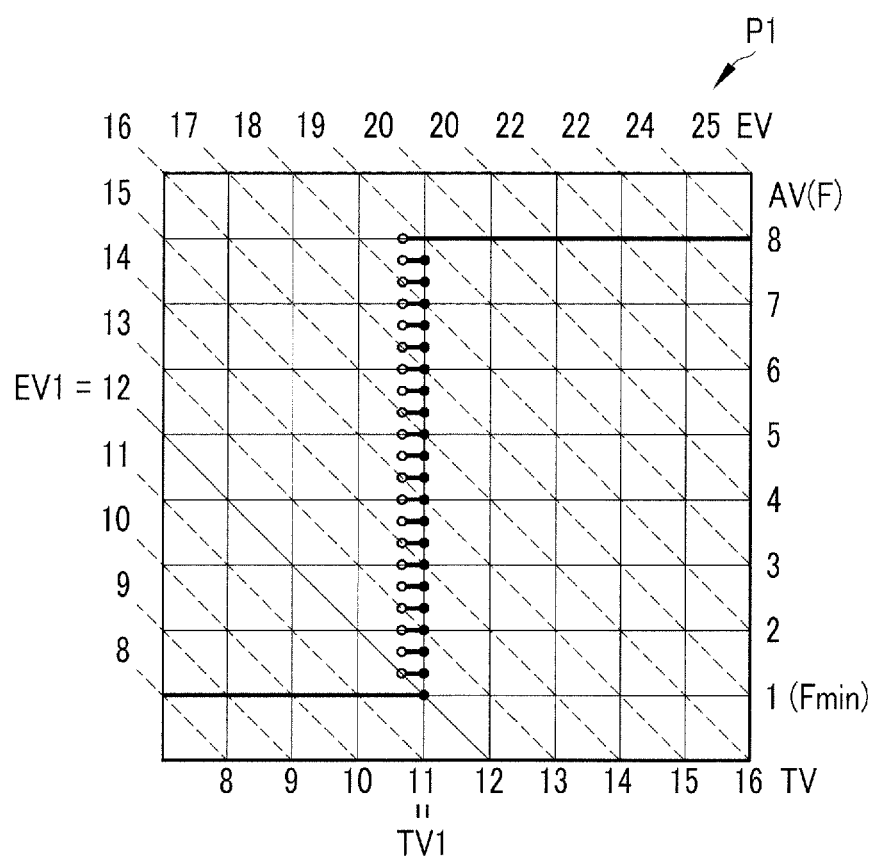
FIG. 9 is a diagram illustrating a first program diagram.
Figure 10:
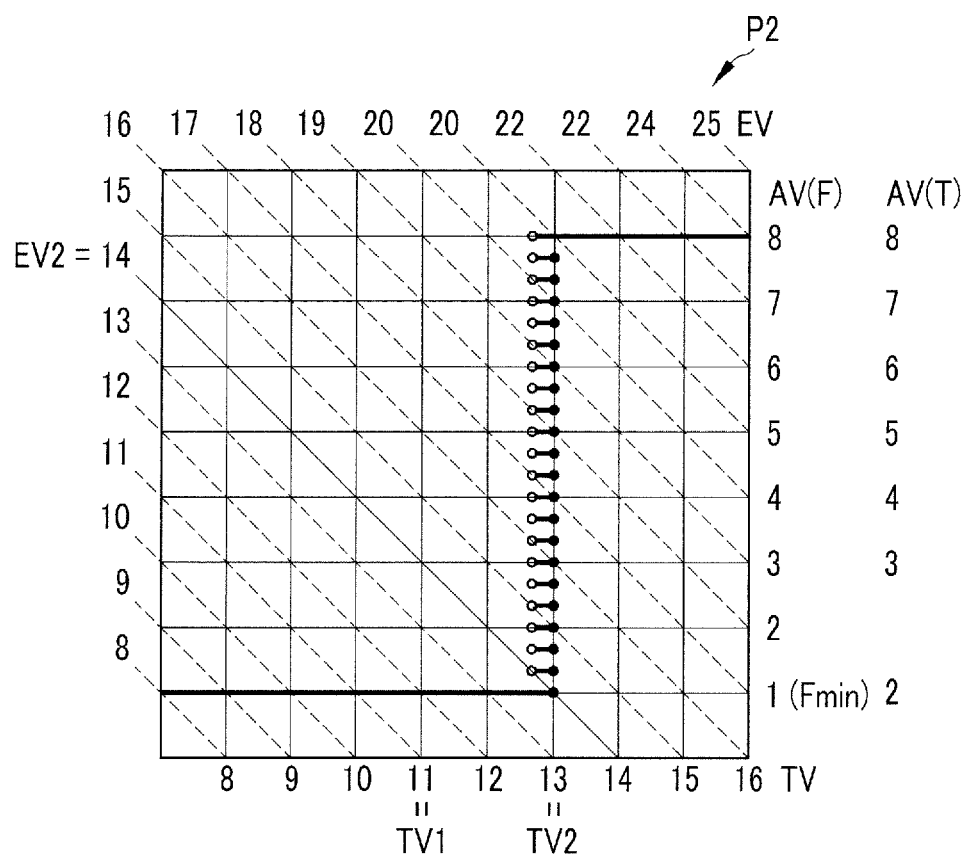
FIG. 10 is a diagram illustrating a second program diagram.

The program diagram storage section 54 stores a first program diagram P1, which is shown in FIG. 9, and a second program diagram P2 which is shown in FIG. 10. The first and second program diagrams P1 and P2 show the exposure value (EV), the AV, and the time value (TV) satisfying Arithmetic Expression (4) of an additive system of photographic exposure (APEX). In the first and second program diagrams P1 and P2, one group of AV and TV corresponds to one EV.

$$EV=AV+TV \quad (4)$$

EV shows an amount of exposure. TV shows a relationship between the shutter speed t (unit: seconds) and Expression (5).

$$TV=-\log_2(t) \quad (5)$$

In the first and second program diagrams P1 and P2, the AV is represented by using the above-mentioned AV(F).

The first and second program diagrams P1 and P2 are the multi-stage stop type. In the multi-stage stop type program diagram, since the AV takes discrete values, the imaging aperture value (AV) is prevented from frequently changing in accordance with change in amount of imaging exposure EV calculated from the photometric value.

The first program diagram P1 is used basically in a case where the second lens barrel 14 not having the APD filter 26 is connected to the imaging apparatus body 11. As shown in FIG. 9, in the first program diagram P1, an aperture value is fixed at the open aperture value Fmin in the region where an amount of exposure is equal to or less than the first amount of exposure EV1. The open aperture value Fmin corresponds to "AV(F)=1". In the present embodiment, EV1=12. Further, the shutter speed TV1 corresponding to the first amount of exposure EV1 is "11".

The second program diagram P2 is used basically in a case where the first lens barrel 12 not having the APD filter 26 is connected to the imaging apparatus body 11. As shown in FIG. 10, in the second program diagram P2, an aperture value is fixed at the open aperture value Fmin in the region of a second amount of exposure EV2 or less. The second amount of exposure EV2 is a value greater than the first amount of exposure EV1. In the present embodiment, EV2=14. In the second program diagram P2, the region, in which the aperture value is fixed at the open aperture value Fmin, is longer than the first program diagram P1. In the second program diagram, as compared with the case of the first program diagram, the open aperture value Fmin as the imaging aperture value is more preferentially determined.

A shutter speed TV2 corresponding to the second amount of exposure EV2 is "13". The shutter speed TV2 is faster than the shutter speed TV1 corresponding to the first amount of exposure EV1 of the first program diagram P1. In the present embodiment, the shutter speed TV2 is a limit speed on a high speed side of the shutter unit 30.

The imaging exposure determination section 56 performs predetermined calculation on the basis of the photometric value which is sent from the photometric section 52, and thereby calculates an appropriate amount of imaging exposure EV. Further, the imaging exposure determination section 56 selects the first program diagram P1 or the second program diagram P2 from the program diagram storage section 54 through a method to be described later, on the basis of the APD filter information and the subject information which are sent from the main control section 34.

The imaging exposure determination section 56 determines one group of the imaging aperture value and the imaging shutter speed, on the basis of the amount of imaging exposure EV obtained through the calculation, by using the selected program diagram. The main control section 34 respectively sets the imaging aperture value and the imaging shutter speed, which are determined by the imaging exposure determination section 56, in the stop 22 and the shutter unit 30.

Figure 11:
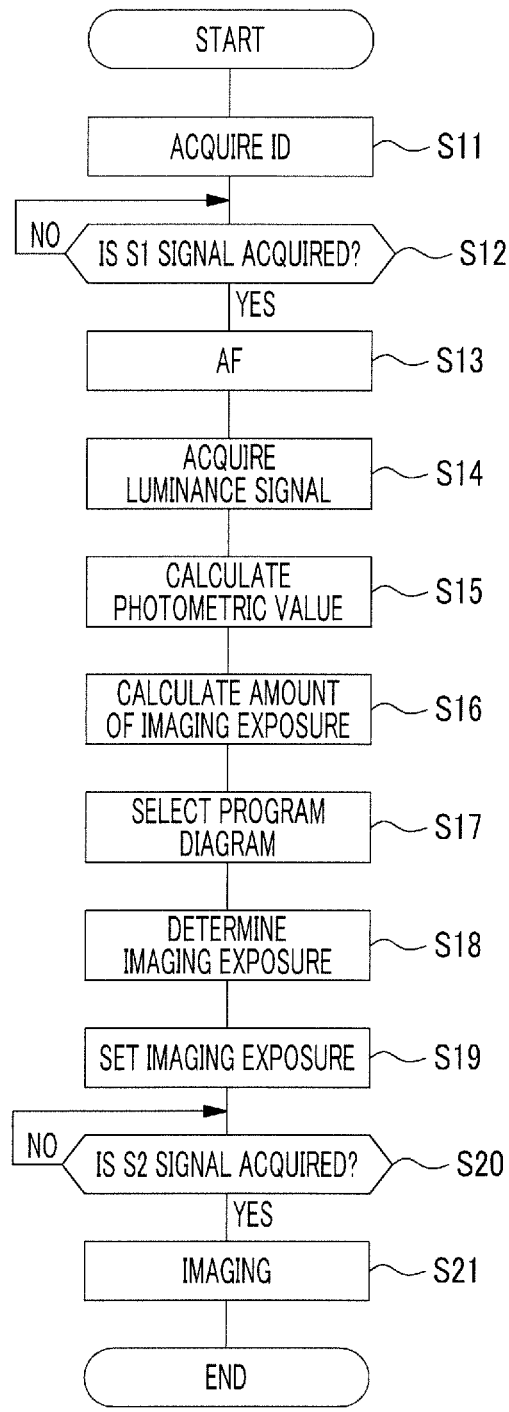
FIG. 11 is a flowchart for explaining an effect of the first embodiment.

Next, the imaging operations of the imaging apparatus 10 will be described with reference to the flowchart shown in FIG. 11. The main control section 34 detects whether or not the first lens barrel 12 or the second lens barrel 14 is connected to the imaging apparatus body 11 in a case where power of the imaging apparatus 10 is turned on through the operation of the power button 13A, and acquires the ID form the connected lens barrel in a case where connection is detected (step S11). Further, in the imaging apparatus 10, in accordance with setting of the mode switch dial 13C, a still image capturing mode or a moving image capturing mode is executed, thereby performing live view display.

In a case where the shutter button 13B is pressed halfway during the live view display and the main control section 34 acquires the S1-on signal (YES in step S12), the AF control section 38 executes the above-mentioned AF control on the AF area as a target (step S13).

The image processing section 36 acquires the luminance signal from the imaging signal (step S14), and transmits the luminance signal to the photometric section 52. The photometric section 52 calculates the photometric value of the subject on the basis of the received luminance signal (step S15), and transmits the photometric value to the imaging exposure determination section 56. The imaging exposure determination section 56 calculates the amount of imaging exposure EV on the basis of the received photometric value (step S16).

Then, the imaging exposure determination section 56 selects the first program diagram P1 or the second program diagram P2 from the program diagram storage section 54 (step S17).

Figure 12:
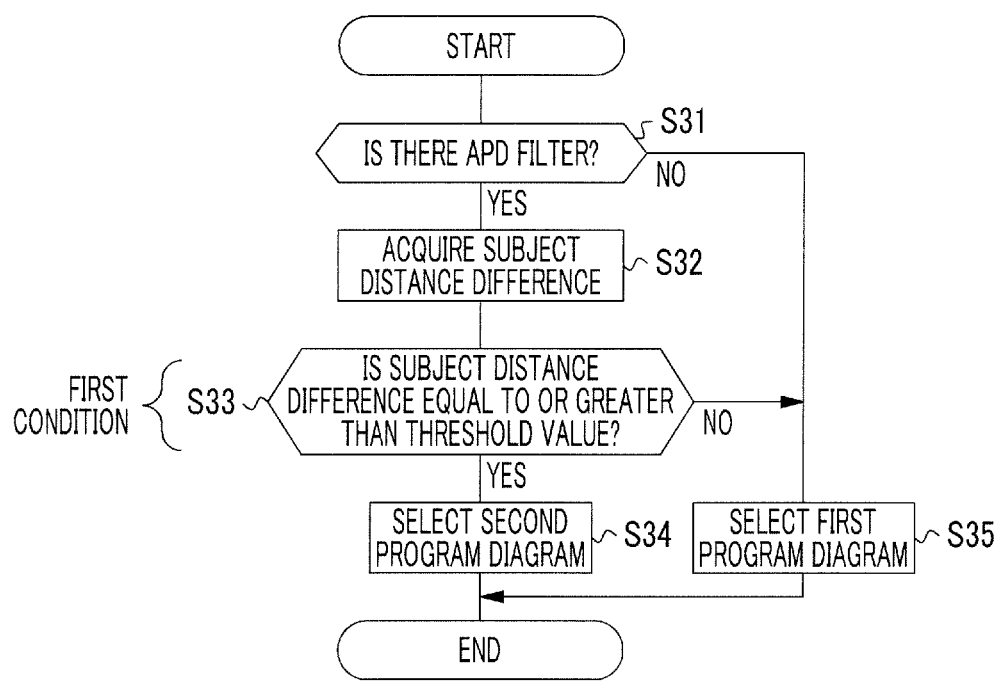
FIG. 12 is a flowchart for explaining a procedure of selecting program diagrams in the first embodiment.

The selection operation of the program diagrams of step S17 is performed on the basis of the flowchart shown in FIG. 12. First, the imaging exposure determination section 56 determines whether or not the APD filter 26 is disposed on the optical path (whether or not the APD filter 26 is present), on the basis of the APD filter information which is sent from the main control section 34 (step S31). In a case where it is determined that the APD filter 26 is not disposed on the optical path (NO in step S31), the imaging exposure determination section 56 selects the first program diagram P1 from the program diagram storage section 54 (step S35).

In contrast, in a case where it is determined that the APD filter 26 is disposed on the optical path (YES in step S31), the imaging exposure determination section 56 causes the subject information acquisition section 40 to acquire the subject information (step S32). In the present embodiment, the subject information acquisition section 40 acquires the above-mentioned subject distance difference Rx as the subject information.

Subsequently, the imaging exposure determination section 56 determines whether or not the acquired subject distance difference Rx is equal to or greater than the threshold value Rth (step S33). In a case where Rx≥Rth (YES in step S33), a blurred image tends to occur in the background of the main subject, and thus the imaging exposure determination section 56 selects the second program diagram P2 (step S34).

In contrast, in a case where Rx<Rth (NO in step S33), a blurred image is hard to occur in the background of the main subject, and thus the imaging exposure determination section 56 selects the first program diagram P1 (step S35).

Returning to FIG. 11, the imaging exposure determination section 56 determines imaging exposure (the imaging aperture value and the imaging shutter speed), on the basis of the amount of imaging exposure EV calculated in step S16, by using the selected program diagram (step S18). The main control section 34 respectively sets the imaging aperture value and the imaging shutter speed in the stop 22 and the shutter unit 30 (step S19).

Then, after setting of the imaging exposure, in a case where the shutter button 13B is pressed fully and the main control section 34 acquires the S2-on signal (YES in step S20), imaging is executed (step S21). For example, in a case where the APD filter 26 is disposed on the optical path, Rx≥Rth may be satisfied, the second program diagram P2 may be selected, and imaging may be performed. In this case, gradation is given to the outline of the blurred image occurring in the background of the main subject, due to the effect of the APD filter 26. Thereby it is possible to achieve beautiful blurring.

As described above, in the imaging apparatus 10 of the present invention, even in a case where the APD filter 26 is disposed on the optical path, a condition (first condition) of Rx<Rth may be satisfied, and it may be determined that there is an imaged scene in which a blurred image is hard to occur in the background of the main subject. In this case, not the second program diagram P2, which is a program diagram for APD, but the first program diagram P1, which is a normal program diagram, is selected.

In a case where the second program diagram P2 is used in such an imaged scene in which a blurred image is hard to occur, overexposure may occur. In this case, in order to keep the depth of field low by preferentially using the open aperture value, the imaging shutter speed is increased by adjusting the shutter speed. As described above, in a case where the imaging shutter speed is increased, adverse effects such as flickering may occur under an indoor light source such as a fluorescent lamp.

In the imaging apparatus 10 of the present invention, in the imaged scene, even in a case where the APD filter 26 is disposed on the optical path, the first program diagram P1 is selected. Therefore, adverse effects such as flickering are prevented from occurring. That is, in the imaging apparatus 10 of the present invention, the first and second program diagrams P1 and P2 are appropriately selected.

Second Embodiment

In the first embodiment, in a case where the APD filter 26 is disposed on the optical path, the imaging exposure determination section 56 sets a condition, in which Rx≥Rth is satisfied, as the condition (the first condition described in the claims) for selecting the second program diagram P2. This is a condition for generating a blurred image as a target of the apodization effect.

However, the blurred image is generated to make an image of the main subject, which is in focus, stand out. Therefore, in a case where the main subject distance is small to a certain extent and the size of the main subject within the image is not so large to a certain extent, the main subject cannot be made to stand out. For example, in the imaged scene in which images of buildings and landscapes at long distances are captured, it cannot be expected to obtain an image in which the main subject is made to stand out by using the blurred image.

Accordingly, in the second embodiment, in a case where the APD filter 26 is disposed on the optical path, the imaging exposure determination section 56 sets a condition (the first condition described in the claims) in which the main subject distance Dm is less than a specific distance, in addition to a condition in which Rx≥Rth is satisfied, and then selects the second program diagram P2.

Figure 13:
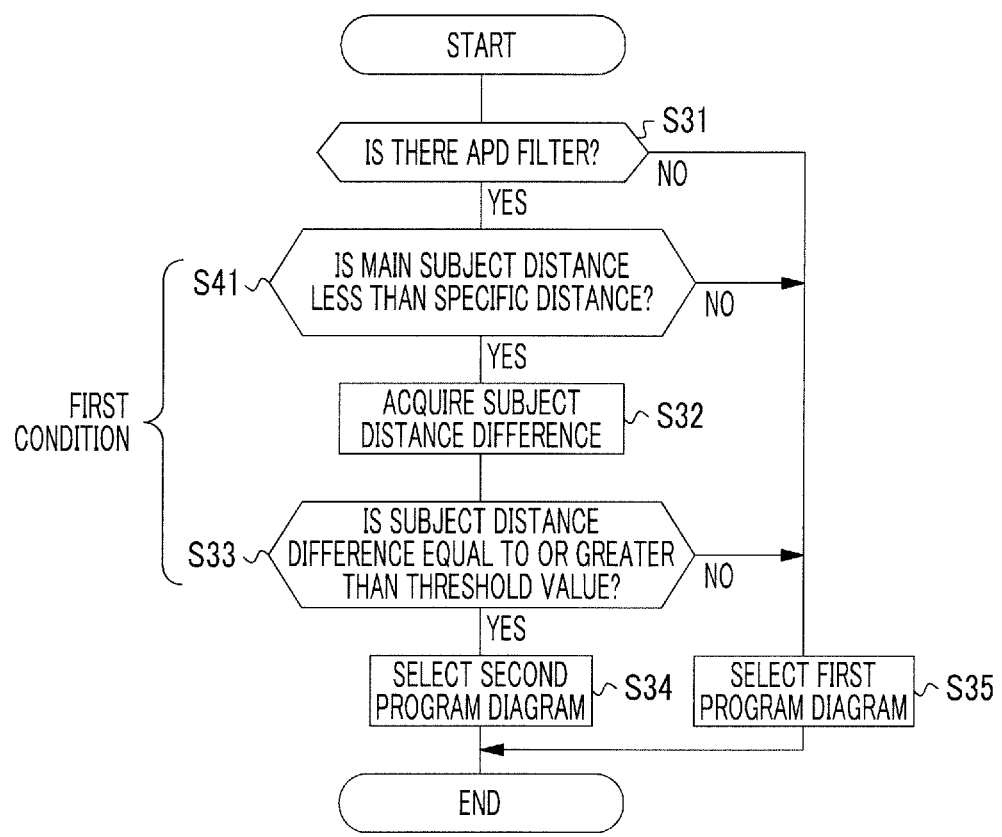
FIG. 13 is a flowchart for explaining a procedure of selecting program diagrams in a second embodiment.

Specifically, in the second embodiment, the program diagram is selected on the basis of the flowchart shown in FIG. 13. In a case where it is determined that the APD filter 26 is present on the optical path (YES in step S31), the imaging exposure determination section 56 first determines whether or not the main subject distance Dm is less than the specific distance (step S41).

In a case where the main subject distance Dm is less than the specific distance (YES in step S41), the imaging exposure determination section 56 acquires the subject distance difference Rx as the subject information (step S32). Then, the imaging exposure determination section 56 determines whether or not the subject distance difference Rx is equal to or greater than the threshold value Rth (step S33). In a case where Rx≥Rth (YES in step S33), the second program diagram P2 is selected (step S34).

In contrast, in a case where the main subject distance Dm is equal to or greater than the specific distance (NO in step S41), the imaging exposure determination section 56 selects the first program diagram P1 (step S35). The other configuration of the second embodiment is the same as that of the first embodiment. In the second embodiment, steps S41 and S33 correspond to the "first condition" described in the claims.

As described above, in the second embodiment, before the program diagram is selected on the basis of the subject distance difference Rx, on the basis of the main subject distance Dm, in a case where the main subject distance Dm is equal to or greater than the specific distance, the first program diagram P1 is selected without the operation of calculating the subject distance difference Rx. Therefore, there is also an effect of increasing the processing of selecting the program diagram.

Further, in the first embodiment, in the imaged scene in which images of buildings and landscapes at long distances are captured, in a case where the APD filter 26 is disposed on the optical path, the second program diagram P2 is selected, the open aperture value is preferentially used, and the depth of field is kept low. In contrast, in the second embodiment, in the imaged scene in which images of buildings and landscapes at long distances are captured, even in a case where the APD filter 26 is disposed on the optical path, the first program diagram P1 is selected. Therefore, the stop is narrowed down, and the depth of field becomes deeper. As a result, it is easy to obtain a sharp image in which all subjects are in focus.

Third Embodiment

In the second embodiment, in a case where the APD filter 26 is disposed on the optical path, the imaging exposure determination section 56 sets a condition in which the main subject distance Dm is less than the specific distance, in addition to a condition in which Rx≥Rth is satisfied, and then selects the second program diagram P2. In the third embodiment, in a case where the APD filter 26 is disposed on the optical path, in addition to a condition in which Rx≥Rth is satisfied, a condition, in which a size of a face of a person who is detected in the image is equal to or greater than a threshold value, is set. On the conditions, the second program diagram P2 is selected.

In the third embodiment, the subject information acquisition section 40 receives the image data, which is generated on the basis of the imaging signal sent from the image processing section 36, and detects whether or not the face of the person within the image is present. For example, the subject information acquisition section 40 stores, in advance, face information about the face of the person such as eyes, a nose, and a mouth, and performs face detection from the image by performing pattern recognition using the face information.

Further, the subject information acquisition section 40 calculates the size of the face in a case where the face is detected through the face detection. For example, the subject information acquisition section 40 calculates an area of a region which is detected as the face, in the image.

In the imaged scene in which the main subject is made to stand out by using the blurred image, it is necessary to increase the size of the face, which is the main subject, in the image to a certain extent. Thus, on the basis of the size (for example, the area) of the face, it can be determined whether or not it is possible to obtain an image in which the main subject is made to stand out by using the blurred image.

Figure 14:
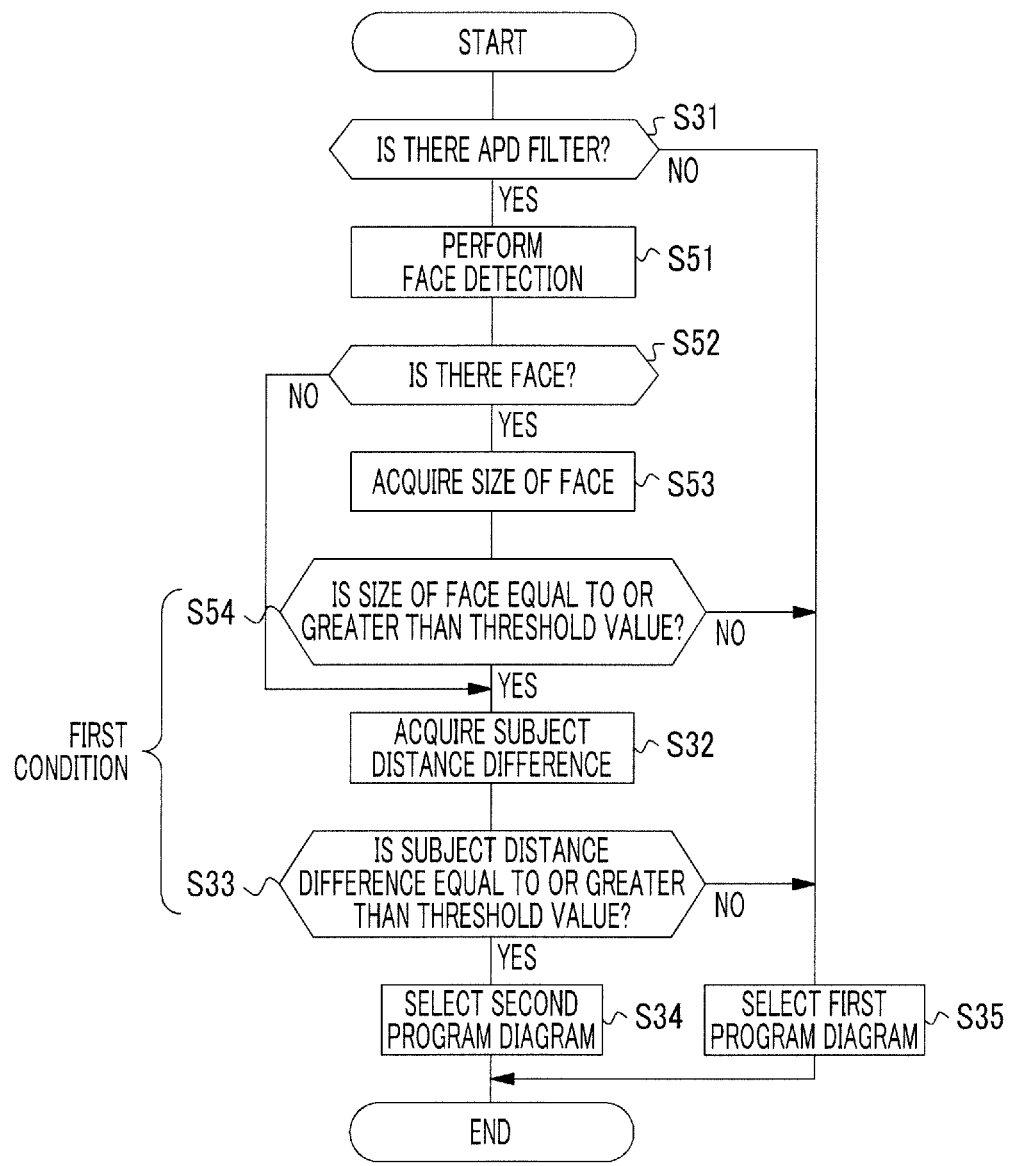
FIG. 14 is a flowchart for explaining a procedure of selecting program diagrams in a third embodiment.

Specifically, in the third embodiment, the imaging exposure determination section 56 performs the selection of the program diagram, on the basis of the flowchart shown in FIG. 14. The imaging exposure determination section 56 determines whether or not the APD filter 26 is disposed on the optical path, on the basis of the APD filter information (step S31). In a case where it is determined that the APD filter 26 is not disposed on the optical path (NO in step S31), the imaging exposure determination section 56 selects the first program diagram P1 from the program diagram storage section 54 (step S35).

In contrast, in a case where it is determined that the APD filter 26 is present on the optical path (YES in step S31), the imaging exposure determination section 56 causes the subject information acquisition section 40 to acquire the face detection (step S51). The subject information acquisition section 40 detects whether or not the face of the subject is present on the basis of the imaging signal (step S52). In a case where the face is detected (YES in step S52), the subject information acquisition section 40 acquires the size of the face (step S53).

The imaging exposure determination section 56 determines whether or not the size of the face obtained by the subject information acquisition section 40 is equal to or greater than the threshold value (step S54). In a case where the size of the face is less than the threshold value (NO in step S54), the imaging exposure determination section 56 selects the first program diagram P1 (step S35). In contrast, in a case where the size of the face is equal to or greater than the threshold value (YES in step S54), the imaging exposure determination section 56 acquires the above-mentioned subject distance difference Rx (step S32). In addition, in step S52, even in a case where the face is not detected (NO in step S52), the current process advances to step S32.

In a case where the subject distance difference Rx is acquired, the imaging exposure determination section 56 determines whether or not the subject distance difference Rx is equal to or greater than the threshold value Rth (step S33). In a case where Rx. Rth (YES in step S33), the imaging exposure determination section 56 selects the second program diagram P2 (step S34). In contrast, in a case where Rx<Rth (NO in step S33), the imaging exposure determination section 56 selects the first program diagram P1 (step S35). In the second embodiment, steps S54 and S33 correspond to the "first condition" described in the claims.

As described above, in the third embodiment, in a case where the APD filter 26 is disposed on the optical path, in addition to the condition in which Rx≥Rth is satisfied, a condition in which the size of the face detected in the image is equal to or greater than the threshold value, and then the second program diagram P2 is selected. Therefore, the second program diagram P2 is not selected except for the imaged scene capable of obtaining the image in which the main subject is made to stand out by using the blurred image. Thus the adverse effects such as flickering are prevented from being caused by selecting the second program diagram P2.

Fourth Embodiment

In the first embodiment, the shutter speed is controlled by the shutter unit 30, but the shutter speed may be controlled through an electronic shutter function of the imaging element 32. Generally, through the electronic shutter function, the shutter speed can be set as a higher speed as compared with the shutter unit 30 as a mechanical shutter. As described above, by using the electronic shutter function, a range, in which the open aperture value Fmin is determined as the imaging aperture value, can be extended to the high exposure value side.

Figure 15:
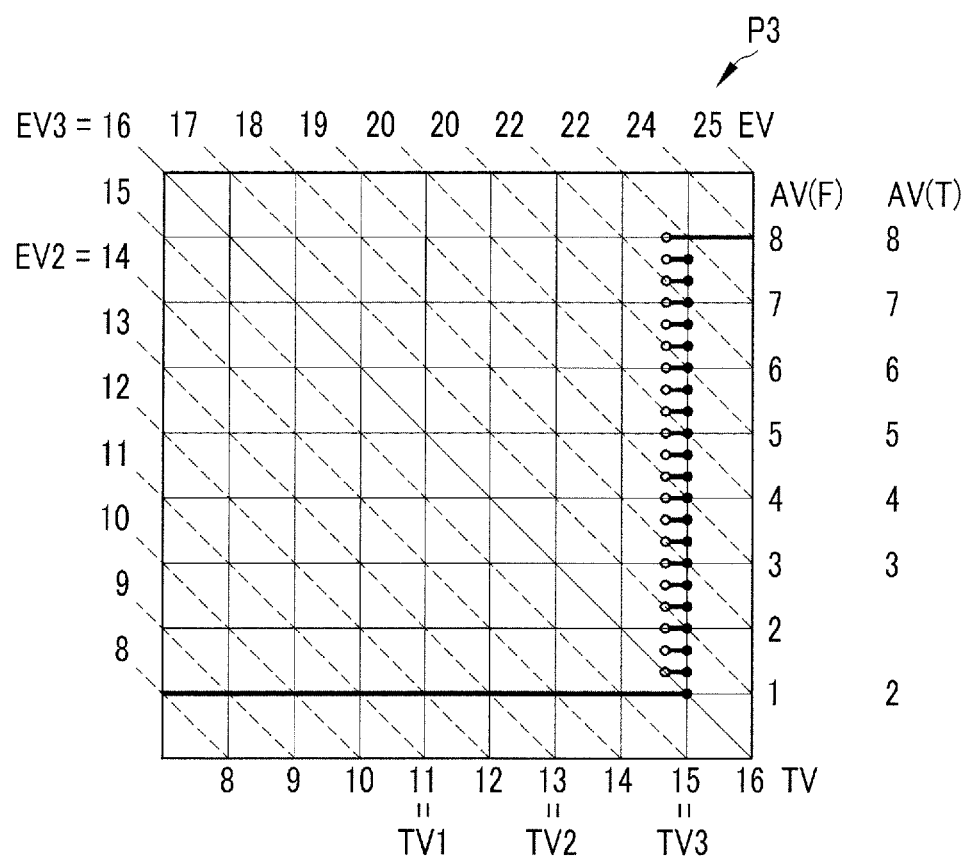
FIG. 15 is a diagram illustrating a third program diagram.

In the fourth embodiment, the program diagram storage section 54 stores a third program diagram P3 shown in FIG. 15, in addition to the first program diagram P1 shown in FIG. 9 and the second program diagram P2 shown in FIG. 10. In the third program diagram P3, an aperture value is fixed at the open aperture value Fmin at a third amount of exposure EV3, which is greater than the second amount of exposure EV2, or less. In the present embodiment, EV3=16.

An imaging shutter speed TV3 corresponding to the third amount of exposure EV3 is faster than the shutter speed TV2 which is a limit speed on the high speed side of the shutter unit 30. For example, TV3=15. Hence, in the third program diagram P3, the imaging shutter speed, which is determined in a region which is on the higher speed side than that of the TV2, is set using the electronic shutter function of the imaging element 32.

Figure 16:
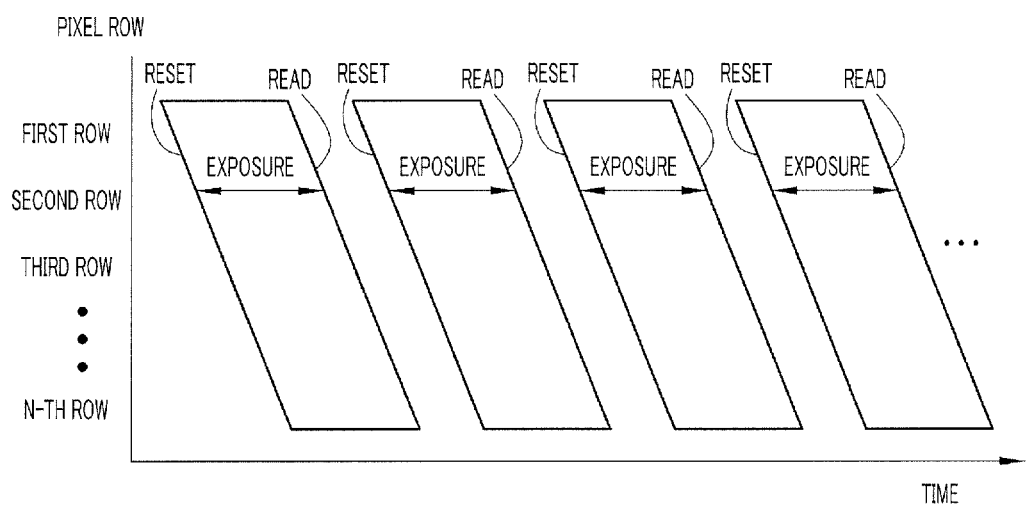
FIG. 16 is a diagram for explaining imaging operations in a rolling shutter system.

The imaging element 32 performs an imaging operation in the rolling shutter system. As shown in FIG. 16, the imaging element 32 performs resetting of electric charge, exposure, and reading of accumulated electric charge, for each one pixel row. The reset timing and the readout timing of the charge are different for each pixel row. The time period from the completion of the resetting of electric charge to the start of the reading of electric charge is the same for each pixel row. Therefore, the exposure time period differs for each pixel row. During the live view display or in a case of moving image capturing mode, resetting and reading operations from the first pixel row to the last pixel row are repeatedly performed.

However, in the rolling shutter system, the exposure time period differs for each pixel row. Thus, in a case where there is movement in the main subject, distortion may occur in the image of the main subject. The distortion increases as an amount of movement of the main subject increases. Further, in the rolling shutter system, the distortion increases as the imaging shutter speed increases. The reason for this is that, in the rolling shutter system, as the imaging shutter speed increases, the overlap between the exposure time periods of respective pixel rows decreases.

Thus, in the fourth embodiment, the imaging exposure determination section 56 selects the third program diagram P3 in a case of satisfying a condition (a second condition described in the claims) in which the amount of movement of the main subject is equal to or less than a specific value, in addition to the case of satisfying a condition of Rx≥Rth (a first condition described in the claims).

Figure 17:
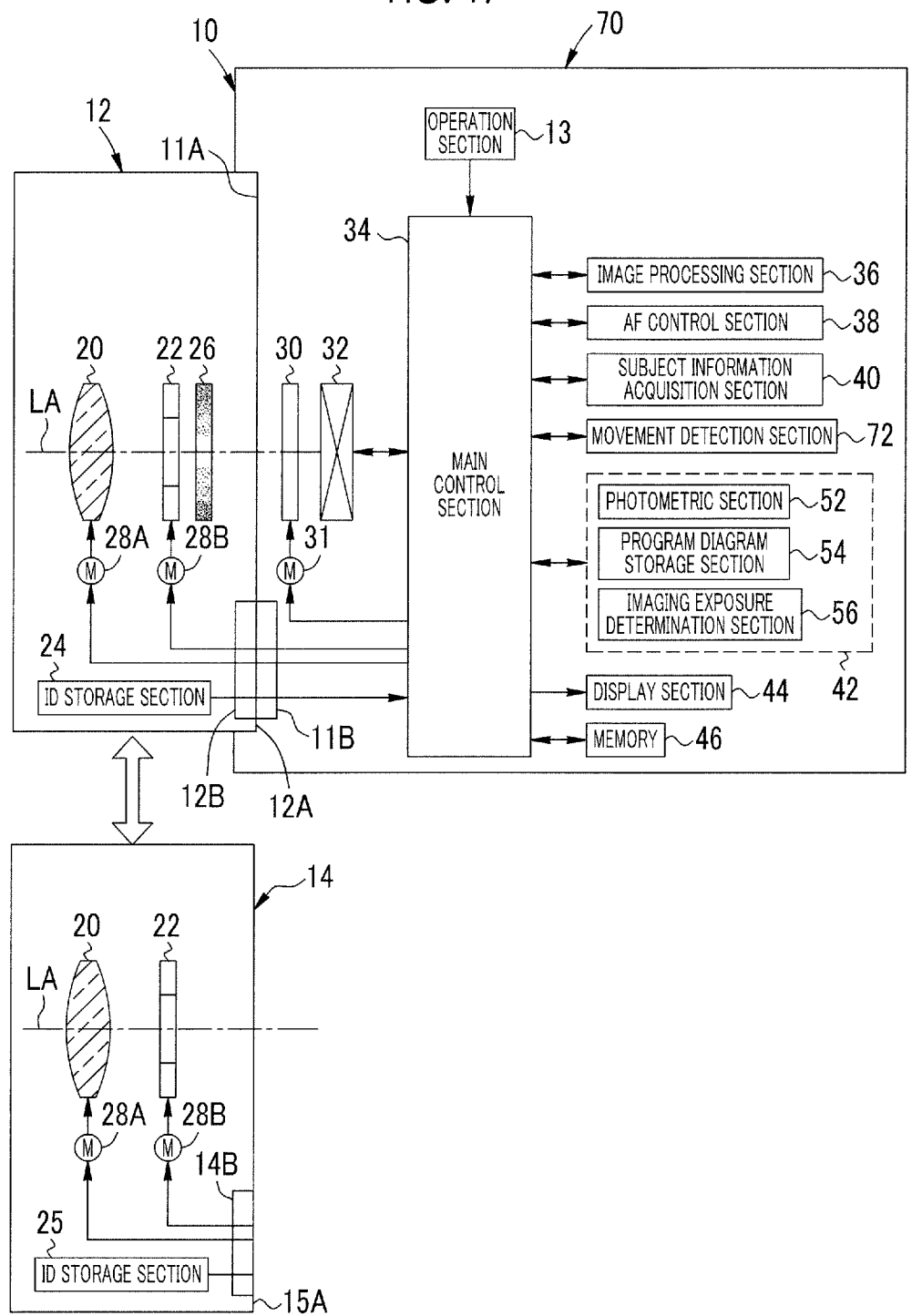
FIG. 17 is a block diagram illustrating a configuration of the imaging apparatus of a fourth embodiment.

In FIG. 17, an imaging apparatus body 70 of a fourth embodiment, in addition to the configurations of the imaging apparatus body 11 of the first embodiment, a movement detection section 72, which detects the amount of movement of the main subject, is provided.

Figure 18:
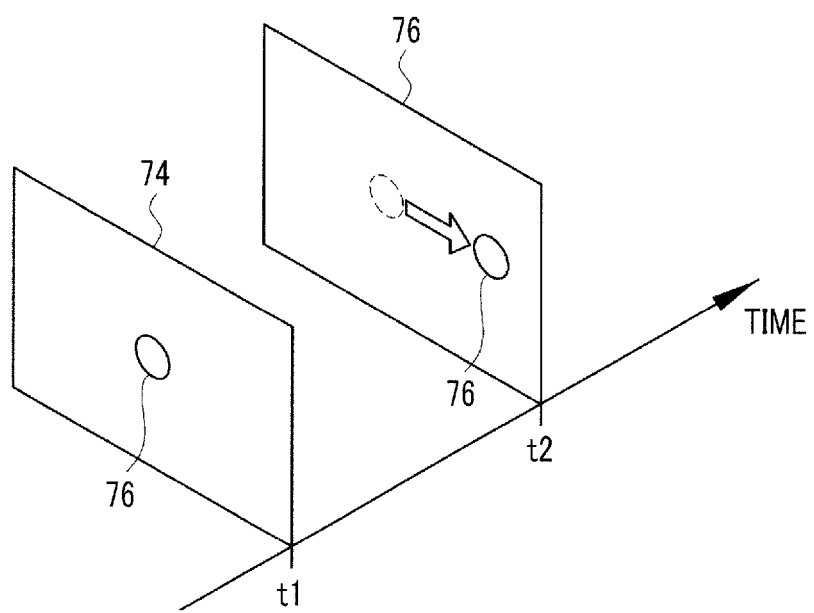
FIG. 18 is a diagram for explaining detection for an amount of movement.

The movement detection section 72 detects the amount of movement of the main subject on the basis of an imaging signal of a plurality of frames which is output from the imaging element 32 during the live view display. For example, as shown in FIG. 18, the movement detection section 72 acquires image data 74 of one frame (first frame), which is obtained at a time t1 during the live view display, and image data 75 of one frame (second frame), which is obtained at a time t2, from the image processing section 36. The movement detection section 72 divides each of the acquired image data pieces 74 and 75 into a plurality of areas, and calculates luminance values of the areas for each frame. Each of the image data pieces 74 and 75 includes an area which has a specific luminance value corresponding to the main subject 76. The movement detection section 72 detects an area of which a luminance value changes between frames, thereby detecting the amount of movement of the main subject 76. The larger the number of areas of which the luminance values change between the frames, the larger the amount of movement of the main subject 76.

Figure 19:
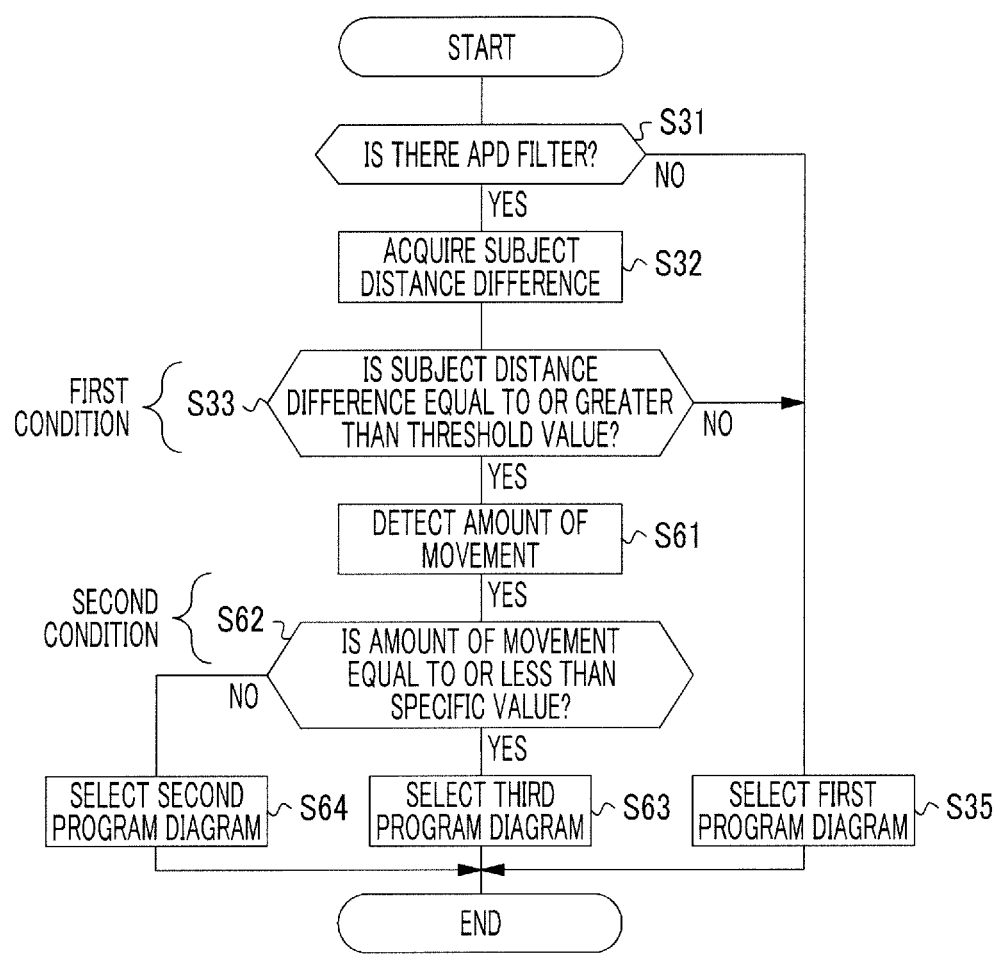
FIG. 19 is a flowchart for explaining a procedure of selecting program diagrams in the fourth embodiment.

Specifically, in the fourth embodiment, the imaging exposure determination section 56 performs the selection of the program diagram, on the basis of the flowchart shown in FIG. 19. The imaging exposure determination section 56 determines whether or not the APD filter 26 is disposed on the optical path, on the basis of the APD filter information (step S31). In a case where it is determined that the APD filter 26 is not disposed on the optical path (NO in step S31), the imaging exposure determination section 56 selects the first program diagram P1 from the program diagram storage section 54 (step S35).

In contrast, in a case where it is determined that the APD filter 26 is disposed on the optical path (YES in step S31), the imaging exposure determination section 56 causes the subject information acquisition section 40 to acquire the subject distance difference Rx as the subject information (step S32). The imaging exposure determination section 56 determines whether or not the subject distance difference Rx is equal to or greater than the threshold value Rth (step S33). In a case where Rx<Rth (NO in step S33), the imaging exposure determination section 56 selects the first program diagram P1 (step S35).

In a case where Rx≥Rth (YES in step S33), the imaging exposure determination section 56 controls the movement detection section 72, such that it detects the amount of movement of the main subject (step S61). The movement detection section 72 transmits the detected amount of movement of the main subject to the imaging exposure determination section 56.

The imaging exposure determination section 56 determines whether or not the received amount of movement of the main subject is equal to or less than the specific value (step S62). In a case where the amount of movement is equal to or less than the specific value (YES in step S62), the imaging exposure determination section 56 selects the third program diagram P3 (step S63). In contrast, in a case where the amount of movement is greater than the specific value (NO in step S62), the imaging exposure determination section 56 selects the second program diagram P2 (step S64). In the fourth embodiment, step S33 corresponds to the "first condition" described in the claims, and step S62 corresponds to the "second condition" described in the claims.

As described above, in the fourth embodiment, on the basis of the amount of movement of the main subject, the second program diagram P2 and the third program diagram P3 are selected, and thereby it is possible to appropriately use the electronic shutter function. In a case where the amount of movement is equal to or less than the specific value, the third program diagram P3 is selected. Therefore, distortion is prevented from occurring in the image of the main subject even in a case where the electronic shutter function of the imaging element 32 is used.

Fifth Embodiment

In the fourth embodiment, the imaging exposure determination section 56 sets a condition, in which the amount of movement of the main subject is equal to or less than the specific value, as the condition for selecting the third program diagram P3. However, in the fifth embodiment, on a condition (the second condition described in the claims) that flickering is not detected, the third program diagram P3 is selected. The reason for this is that it becomes easier for the image to be affected by flickering as the imaging shutter speed becomes faster by using the electronic shutter function.

Figure 20:
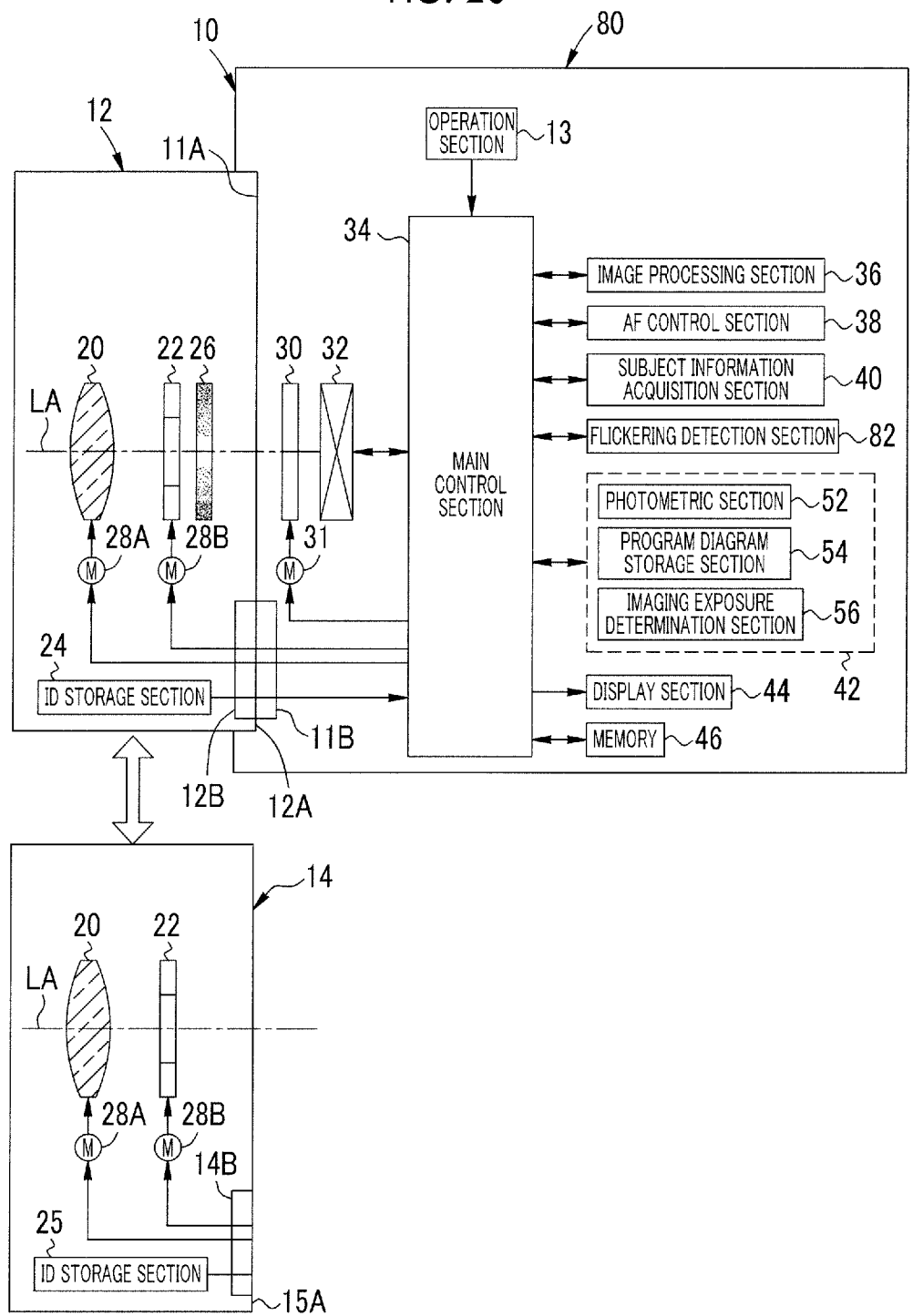
FIG. 20 is a block diagram illustrating a configuration of the imaging apparatus of a fifth embodiment.

In FIG. 20, an imaging apparatus body 80 of a fifth embodiment, in addition to the configurations of the imaging apparatus body 11 of the first embodiment, a flickering detection section 82, which detects whether or not flickering is present, is provided. The flickering is a phenomenon in which temporal light-dark change occurs in the imaging signal in accordance with difference between the imaging frequency and the frequency of the luminance change of a fluorescent lamp which is turned on by a commercial alternate current power supply, in a case where imaging is performed under illumination of the fluorescent lamp. The light-dark change appears as flickering or a striped pattern in the image.

The flickering detection section 82 calculates change in luminance value from the imaging signal of the plurality of frames, and detects whether or not flickering is present. As the flickering detection processing, it is possible to use a technique described in JP2005-33616A. The flickering detection section 82 detects flickering on the assumption of cases of 50 Hz and 60 Hz as the frequencies of the luminance change of the fluorescent lamp as described below.

The flickering detection section 82 sets the frame rate of the imaging element 32 to 50 Hz and sets the shutter speed to 1/50 seconds, during the live view display, and causes the imaging element 32 to periodically perform an imaging operation. The flickering detection section 82 determines whether or not there is change in luminance value at the center of the angle of view between frames, on the basis of the imaging signal which is output from each frame. The flickering detection section 82 determines that flickering is present in a case where there is change in luminance value.

Thereafter, the flickering detection section 82 sets the frame rate of the imaging element 32 to 60 Hz and sets the shutter speed to 1/60 seconds, performs the above-mentioned flickering detection operation, and thereby determines that flickering is present in a case where there is change in luminance value at the center of the angle of view between frames.

Figure 21:
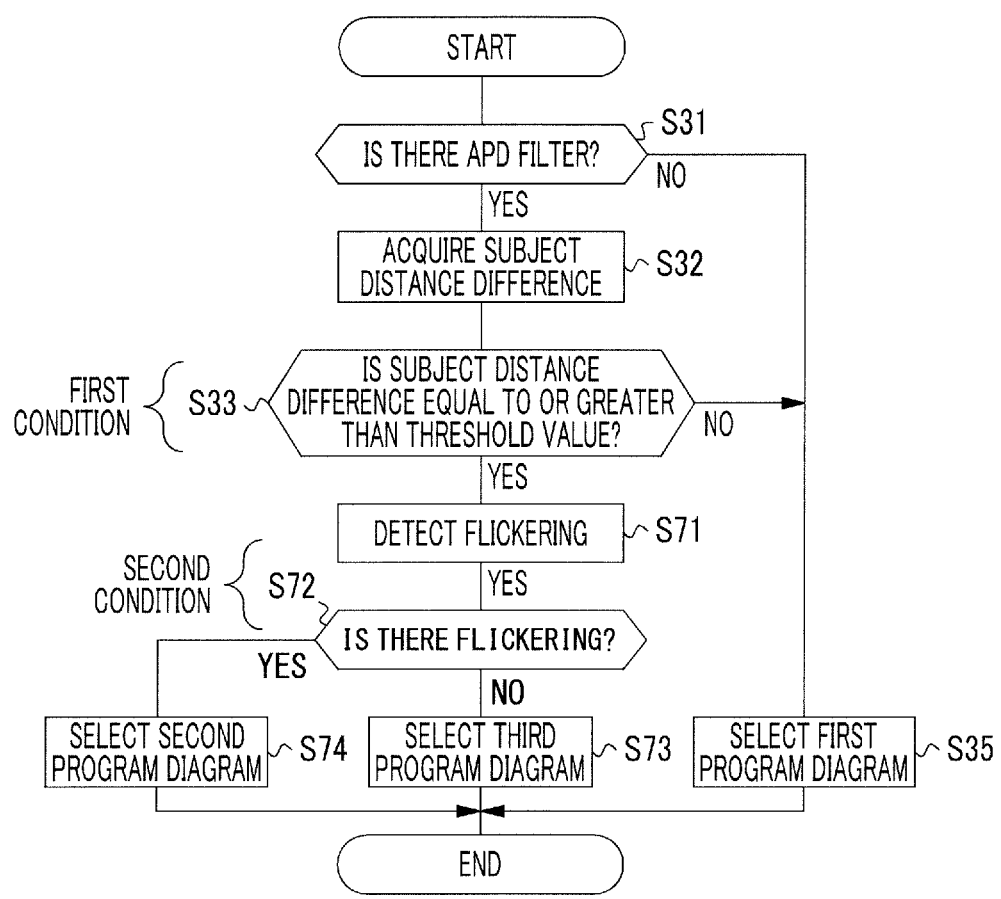
FIG. 21 is a flowchart for explaining a procedure of selecting program diagrams in the fifth embodiment.

Specifically, in the fifth embodiment, the imaging exposure determination section 56 performs the selection of the program diagram, on the basis of the flowchart shown in FIG. 21. This flowchart is different from that of the fourth embodiment in that, instead of the amount of movement of the subject, flickering is detected (step S71), and instead of the determination based on the amount of movement, determination based on whether or not flickering is detected is performed (step S72).

In the fifth embodiment, the imaging exposure determination section 56 selects the third program diagram P3 (step S73) in a case where the flickering detection section 82 does not detect flickering (NO in step S72), and selects the second program diagram P2 (step S74) in a case where flickering is detected (YES in step S72). In the fifth embodiment, step S33 corresponds to the "first condition" described in the claims, and step S72 corresponds to the "second condition" described in the claims.

As described above, in the fifth embodiment, on the basis of whether or not flickering is present, the second program diagram P2 and the third program diagram P3 are selected, and thereby it is possible to appropriately use the electronic shutter function. In a case where there is no flickering, the third program diagram P3 is selected. Therefore, flickering is prevented from occurring in the image even in a case where the electronic shutter function of the imaging element 32 is used.

Further, in each embodiment, the present invention exemplifies an interchangeable lens imaging apparatus from which the lens barrel and the imaging apparatus body are detachable. However, the present invention can be applied to an integrated type imaging apparatus in which a lens barrel and an imaging apparatus body are integrated. In the interchangeable lens imaging apparatus, the APD filter is inserted in and removed from the optical path by interchanging the lens barrel. In the integrated type imaging apparatus, a mechanism, in which the APD filter is inserted in and removed from the optical path, may be provided.

In each embodiment, a CMOS image sensor is used as the imaging element 32, but a charge coupled device (CCD) image sensor may be used.

In each embodiment, the AF control section 38 performs AF control through a contrast AF method, but may perform AF control through a phase difference AF method. That is, the acquisition of the in-focus positions of the blocks, into which the imaging range 48 shown in FIG. 5 is divided, may be performed through the phase difference AF method.

In each embodiment, after the shutter button 13B is pressed halfway, exposure control is performed. However, also during the live view display before the shutter button 13B is pressed halfway, exposure control may be performed.

EXPLANATION OF REFERENCES

10: imaging apparatus
11, 70, 80: imaging apparatus body
11A: lens barrel mount section
11B: electrical contact point
12: first lens barrel
12A: proximal end portion
12B: electrical contact point
13: operation section
13A: power button
13B: shutter button
13C: mode switch dial
14: second lens barrel
14A: proximal end portion
14B: electrical contact point
20: focus lens
22: stop
24, 25: ID storage section
26: APD filter
28A, 28B: motor
30: shutter unit
31: shutter motor
32: imaging element
34: main control section
36: image processing section
38: AF control section
40: subject information acquisition section
42: exposure control section
44: display section
46: memory
48: imaging range
49, 76: main subject
50: subject
52: photometric section
54: program diagram storage section
56: imaging exposure determination section
72: movement detection section
74, 75: image data
82: flickering detection section
P1: first program diagram
P2: second program diagram
P3: third program diagram

The invention claimed is:

1. An imaging apparatus comprising:
an imaging element that photoelectrically converts incident light so as to output an imaging signal;
a stop that adjusts a light amount of the incident light; and
an electric signal processing device configured for:
performing photometry based on the imaging signal;
storing a first program diagram in which an aperture value is fixed at an open aperture value in a case where an amount of exposure is equal to or less than a first amount of exposure, and a second program diagram in which an aperture value is fixed at an open aperture value in a case where the amount of exposure is equal to or less than a second amount of exposure which is greater than the first amount of exposure;
acquiring subject information based on the imaging signal;
determining whether an apodization filter is present or not;
selecting the second program diagram in a case where the apodization filter is determined to be present by the determining and the subject information satisfies a first condition;
selecting the first program diagram in a case where the apodization filter is determined to be not present by the determining, and in a case where the apodization filter is determined to be present by the determining and the subject information does not satisfy the first condition; and determining one group of an imaging aperture value and an imaging shutter speed based on an amount of imaging exposure which is calculated from a photometric value obtained by the performing photometry.

2. The imaging apparatus according to claim 1,
wherein the electric signal processing device acquires, as the subject information, a subject distance difference between a main subject and a subject farthest from the main subject, and
wherein the electric signal processing device sets the first condition as a condition in which the subject distance difference is equal to or greater than a threshold value.

3. The imaging apparatus according to claim 1, wherein a shutter speed corresponding to the second amount of exposure in the second program diagram is faster than a shutter speed corresponding to the first amount of exposure in the first program diagram.

4. The imaging apparatus according to claim 3, further comprising a mechanical shutter,
wherein the shutter speed corresponding to the second amount of exposure in the second program diagram is a limit speed on a high speed side of the mechanical shutter.

5. The imaging apparatus according to claim 4,
wherein the imaging element has an electronic shutter function capable of making an imaging shutter speed faster than the limit speed,
wherein the electric signal processing device stores a third program diagram in which an aperture value is fixed at an open aperture value in a case where the amount of exposure is equal to or less than a third amount of exposure which is greater than the second amount of exposure, and
wherein the electric signal processing device selects the third program diagram in a case where the first condition is satisfied and a second condition different from the first condition is satisfied, and selects the second program diagram in a case where the first condition is satisfied and the second condition is not satisfied.

6. An imaging apparatus body in which a first lens barrel having an apodization filter and a second lens barrel having no apodization filter are mountable, the imaging apparatus body comprising:
an imaging element that photoelectrically converts incident light so as to output an imaging signal;
a stop that adjusts a light amount of the incident light; and
an electric signal processing device configured for:
performing photometry based on the imaging signal;
storing a first program diagram in which an aperture value is fixed at an open aperture value in a case where an amount of exposure is equal to or less than a first amount of exposure, and a second program diagram in which an aperture value is fixed at an open aperture value in a case where the amount of exposure is equal to or less than a second amount of exposure which is greater than the first amount of exposure;
acquiring subject information based on the imaging signal;
determining whether the apodization filter is present or not;
selecting the second program diagram in a case where the apodization filter is determined to be present by the determining and the subject information satisfies a first condition;
selecting the first program diagram in a case where the apodization filter is determined to be not present by the determining, and in a case where the apodization filter is determined to be present by the determining and the subject information does not satisfy the first condition; and
determining one group of an imaging aperture value and an imaging shutter speed based on an amount of imaging exposure which is calculated from a photometric value obtained by the performing photometry.

7. A method of controlling an imaging apparatus including an imaging element that photoelectrically converts incident light so as to output an imaging signal, a stop that adjusts a light amount of the incident light, and an electric signal processing device configured for performing photometry based on the imaging signal, storing a first program diagram in which an aperture value is fixed at an open aperture value in a case where an amount of exposure is equal to or less than a first amount of exposure, and a second program diagram in which an aperture value is fixed at an open aperture value in a case where the amount of exposure is equal to or less than a second amount of exposure which is greater than the first amount of exposure, and acquiring subject information based on the imaging signal, the method comprising:
determining whether an apodization filter is present or not;
selecting the second program diagram in a case where the apodization filter is determined to be present by the determining and the subject information satisfies a first condition;
selecting the first program diagram in a case where the apodization filter is determined to be not present by the determining, and in a case where the apodization filter is determined to be present by the determining and the subject information does not satisfy the first condition; and
determining one group of an imaging aperture value and an imaging shutter speed based on an amount of imaging exposure which is calculated from a photometric value obtained by the performing photometry.

* * * * *